(12) United States Patent
Galan et al.

(10) Patent No.: US 12,480,135 B2
(45) Date of Patent: Nov. 25, 2025

(54) COMPOSITIONS AND METHODS FOR DELIVERY OF NUCLEIC ACID TO PLANT CELLS

(71) Applicant: The University of Bristol, Bristol (GB)

(72) Inventors: M. Carmen Galan, Bristol (GB); David Benito-Alifonso, Bristol (GB); Thomas A. Swift, Bristol (GB); Heather M. Whitney, Bristol (GB)

(73) Assignee: The University of Bristol, Bristol (GB)

( * ) Notice: Subject to any disclaimer, the term of this patent is extended or adjusted under 35 U.S.C. 154(b) by 52 days.

(21) Appl. No.: 16/957,023

(22) PCT Filed: Dec. 28, 2018

(86) PCT No.: PCT/EP2018/097143
§ 371 (c)(1),
(2) Date: Jun. 22, 2020

(87) PCT Pub. No.: WO2019/134897
PCT Pub. Date: Jul. 11, 2019

(65) Prior Publication Data
US 2020/0392525 A1  Dec. 17, 2020

(30) Foreign Application Priority Data
Jan. 5, 2018 (GB) .................................. 1800184

(51) Int. Cl.
*C12N 15/82* (2006.01)
*B82Y 5/00* (2011.01)
*C01B 32/174* (2017.01)

(52) U.S. Cl.
CPC ............ *C12N 15/8269* (2013.01); *B82Y 5/00* (2013.01); *C01B 32/174* (2017.08); *C12N 15/8213* (2013.01); *C12N 15/8261* (2013.01); *C12N 15/8279* (2013.01); *Y10S 977/704* (2013.01)

(58) Field of Classification Search
None
See application file for complete search history.

(56) References Cited

U.S. PATENT DOCUMENTS

| | | | | |
|---|---|---|---|---|
| 8,653,327 | B2 * | 2/2014 | Samboju | B82Y 5/00 800/278 |
| 2015/0082478 | A1 * | 3/2015 | Cigan | A01H 5/00 800/300 |

FOREIGN PATENT DOCUMENTS

| WO | WO2012/006443 A2 | 1/2012 |
|---|---|---|
| WO | WO 2014/165667 A1 | 10/2014 |

OTHER PUBLICATIONS

Hill et al 2016 (Nanoscale 8: p. 18630-18634) (Year: 2016).*
Chen et al 2015 (Acta Pharmacologica Sinica 36: p. 1349-1355) (Year: 2015).*
Doyle et al 2019 (Master's Thesis, University of Bristol) (Year: 2019).*
Mukherjee et al 2016 (Frontiers in Plant Science 7:172 p. 1-16) (Year: 2016).*
Altpeter, F., et al. The Plant Cell 28.7 (2016): 1510-1520.
Benito-Aifonsa et al., Angew. Chem. Int. Ed. 2014, 53, 810-814.
Bhaya et al. Annu Rev Genet (2011) 45:273-297.
Chang et al., 2013, Genome editing with RNA-guided Cas9 nuclease in zebrafish embryos, Cell Res 23:465-472.
Cong et al. Science (2013) 339:819-823.
Dimos, Curr. Org. Chem., 20, 682 - 695 (2016).
Feldmann and Marks Mol. Gen. Genet (1987) 208: 1-9).
Gilbert LA et al. (2013) Cell 154:442-451.
Hayes et al. (PNAS (2014) 111(32) 11894-11899.
Hill et al., Fluorescent carbon dots from mono- and polysaccharides: synthesis, properties and applications, Beilstein J. Org. Chem., 2017, 13, 675-693.
Hill et al., Three-minute synthesis of sp3 nanocrystalline carbon dots as non-toxic fluorescent platforms for intracellular delivery, Nanaoscale, 8 (44), 18630-18634 (2016).
Horvath et al., Science (2010) 327:167-170.
Hwang et al., 2013.
Jinek M et al. (2013) elife 2:e00471.
Jinek Met al. Science (2012) 337:816-821.
Jokerst et al., Nanomedicine, 6 (4), 715 - 728 (2011).
Joung & Sander, 2013, TALENs: a widely applicable technology for targeted genome editing, Nat Rev Mai Cell Bio 14:49-55.
Kromkijk et al., Science vol. 354, No. 6314, (2016), pp. 857-861.
Van Heukelem, I., Thomas, C. S. Computer-assisted high-performance liquid chromatography method development with applications to the isolation and analysis of phytoplankton pigments. Journal of Chromatography A, 910, 31-49 (2001).

(Continued)

*Primary Examiner* — Matthew R Keogh
(74) *Attorney, Agent, or Firm* — Stites & Harbison PLLC; Richard S. Myers, Jr.

(57) ABSTRACT

The present proposals relate to the delivery of nucleic acids to plant cells and particularly, although not exclusively, to bioengineering of plants by delivery of DNA and expression in a host plant. The proposals also relates to enhancement of photosynthesis in plants and to algaecidal compositions. In these proposals, the CND compound has the formula: CND-[(L)$_y$-X] in which: CND is a carbon nanodot having a diameter in the range 0.5-20 nm; L is a linker selected from C$_{1-20}$ alkylene, or C$_{1-20}$ alkenylene groups optionally including 1-5 heteroatoms selected from —O—, —N(H)—, and —S—; X is selected from: a) PEG-(NR$_2$)$_q$, in which each R is independently H or C$_{1-6}$ alkyl and the integer q is 0 or 1 and in which the PEG-(NR2)q is optionally associated with a nucleic acid; b) a sugar moiety; and c) an NR2 group, in which each R is independently H or C$_{1-6}$ alkyl wherein PEG is a polyethylene glycol having a weight average molecular weight (Mw) greater than 200 the integer y is 0 or 1; wherein when y is 1, each of the CND and X moieties is attached to the L group either directly or via an amide bond; and z is an integer greater than or equal to 1.

23 Claims, 25 Drawing Sheets

(56) References Cited

OTHER PUBLICATIONS

Lam et al., Critical reviews in Toxicology, 2006, 6(3), 189-217.
Li et al. J. Phys. Chem., vol. 114(28), pp. 12062-12068 (2010).
Lin et al., Journal of Fluorescence, 2017, 27(4), 1495-1503.
Liu et al. Biomaterials, 33 (13) 3604-3613 (2012).
Lu et al., Mater. Sci. Eng. C, 82, 190-196 (2018).
Mali P et al. (2013) Science 339:823-826.
Mitter, N., et al. Nature Plants 3 (2017): 16207.
Qi et al. (2013) Cell 152:1173-1183.
Ray et al. Application of Carbon in Carbon Nanomaterials for Biological 21017 pp. 163-203.
Sambrook, J., Russel, D.W. Molecular Cloning, A Laboratory Manual. 3 ed. 2001, Cold Spring Harbor, New York: Cold Spring Harbor Laboratory Press.
Sinha & Roitsch, Photosynthetica, 39 (4), 611-614 (2002).
Song et al., Food and Energy Security, vol. 5, No. 1, 2016, pp. 18-25.
Suk et al., Adv. Drug Deliv. Rev., 99A, 28-51 (2016).
Terns et al., Current Opinion in Microbiology (2011) 14:321-327.
Villagarcia et al. Small, vol. 8(15), pp. 2328-2334 (2012).
Wang H et al. (2013) Cell 10 153:910-918).
Wiedenheft et al. Nature (2012) 482:331-338).
Yang H et al. (2013) Cell 154:1370-1379.
Zhang et al., ACS Nano, vol. 5 (9), pp. 7020-7033 (2011).
Zheng et al., RSC Adv., 2017,7, 33459-33465,.
Zhu et al. in Chem. Commun., 2009, 5118-5120.
Zhu et al., (Current Opinion in Biotechnology) vol. 19, Issue 2, Apr. 2008, pp. 153-159.
Roell, Marc-Sven; A Novel Trojan Horse for Molecule Delivery into Plants, Plant Physiol. Vol. 184, 2020, pp. 548-549.
Zhang, et al., Nanoparticle cellular internalization is not required for RNA delivery to mature plant leaves, Nat Nanotechnol. Feb. 2022 ; 17(2): 197-205.
Furuhata, et al., A method using electroporation for the protein delivery of Cre recombinase into cultured *Arabidopsis* cells with an intact cell wall, Scientific Reports; (2019) 9:2163; pp. 1-10.
Freeman, , J. P., J. Draper, M. R. Davey, E. C. Cocking, K. M. A. Gartland, K. Harding, and D. Pental. "A comparison of methods for plasmid delivery into plant protoplasts." Plant and cell physiology 25, No. 8 (1984): 1353-1365.
Mathur, Jaideep, and Csaba Koncz. "PEG-mediated protoplast transformation with naked DNA." In *Arabidopsis* Protocols, pp. 267-276. Humana Press, 1998.
Masani, M.Y.A., Parveez, G.K.A., Noll, G., Fizree, M.D., Sambanthamurthi, R. and Pruefer, D., 2022. Protoplast Isolation and Transformation in Oil Palm. In Protoplast Technology (pp. 187-202). Humana, New York, NY.
Zhang, et al., Biotoxicity of degradable carbon dots towards microalgae Chlorella vulgaris, Environ. Sci.: Nano, 2019, 6, 3316-3323.
Benito-Alifonso, et al., Angew. Chem. Int. Ed. 2014, 53, 810-814.
Wang, et al., Carbon Dots Enable E!cient Delivery of Functional DNA in Plants, ACS Appl. Bio Mater. 2020, 3, 8857-8864.
Hansen, et al., "Agrolistic" transformation of plant cells: Integration of T-strands generated in planta; Proc. Natl. Acad. Sci. USA, Dec. 1996, Plant Biology, vol. 93, pp. 14978-14983.

* cited by examiner

COMPOSITIONS AND METHODS FOR DELIVERY OF NUCLEIC ACID TO PLANT CELLS

CROSS REFERENCE TO RELATED APPLICATIONS

This application is a § 371 National State Application of PCT/EP2018/097143 filed Dec. 28, 2018 which claims priority to GB 1800184.2 filed Jan. 5, 2018.

FIELD OF THE INVENTION

The present invention relates to the delivery of nucleic acids to plant cells and particularly, although not exclusively, to bioengineering of plants by delivery of DNA and expression in a host plant. The invention also relates to enhancement of photosynthesis in plants. The invention further relates to algaecidical compositions.

BACKGROUND

The ability to transform plants has enabled both fundamental insights into plant biology through the modification of model species and revolutionised commercial agriculture, and will continue to be central to future technologies such as plant synthetic biology, molecular farming and genome editing. However, a major bottleneck in taking full advantage of the potential of these technology advances has been that for most species transformation and plant regeneration is still a slow, arduous, inefficient and expensive process (Altpeter, F., et al. The Plant Cell 28.7 (2016): 1510-1520). Currently there is no one plant transformation system that combines advantages of Agrobacterium-based floral dip (ease of application, transformation occurs 'in planta' so no need for tissue culture, lack of tissue damage) with advantages of biolistics (wider diversity of species and constructs, speed of transient expression) plus confers additional advantages (inexpensive, transformation of mature whole plants, flexibility of application via roots, leaves or seeds, lack of requirement for specialist growth conditions or equipment, specificity as to tissue or organelle targeted). A system that achieved this would lead to significant advances in plant sciences in general, including contributing to the production of enhanced crop lines, plus would produce a robust toolkit for synthetic biology. As such, it would be directly relevant to several current research targets and the low cost, low tech aspects of such a system could also contribute more generally to aims in plant science research on a global scale.

Published research has highlighted the potential of technology at the nanoparticle-nucleotide interface (Mitter, N., et al. Nature Plants 3 (2017): 16207). That publication describes the use of clay nanosheets to deliver dsRNA to plants for RNAi, and in doing so successfully protecting plants against virus infection. While the potential of the technology is emphasised, so are the current practical problems. The main barrier is that, unlike the CND system proposed herein, no uptake of the clay nanosheets occurs. Clay nanoparticles sprayed onto the leaf surface remain there, providing a protective carrier and reservoir for the electrostatically attached nucleotides. Due to this lack of uptake and systemic transport, only extremely small nucleotides such as small dsRNA molecules can work with the system, which presents practical problems such the cost of production and the inherent lack of stability of dsRNA. As a result there is no potential with this system to introduce 'novel' characteristics to a plant, such as novel protein biosynthesis or the machinery required for genome editing.

Besides the introduction of novel plant characteristics, another fundamental goal of plant biotechnology is to increase the growth rate of plants (and thus achieve greater biomass yields), particularly of crops. To meet this goal, researchers have previously attempted to improve the efficiency of photosynthesis (Song et al., Food and Energy Security, 2016), for instance by accelerating the response time of tobacco plants to natural shading events (Kromkijk et al., Science 2016). It is estimated that most of the biochemical processes involved in photosynthesis are over 80% efficient, meaning that improvement of any of the biochemical components would be very challenging. Nevertheless, the maximal overall efficiency of photosynthesis (the percentage of light energy converted to plant biomass) has been calculated to be just 4.6% for C3 plants and 6% for C4 plants (Zhu et al., Curr. Op in Biotech. 2008) meaning that improving overall photosynthetic efficiency could provide a dramatic increase in crops yield.

Carbon nanostructures, and in particular carbon nanoparticles, have been shown to be taken up into biological cells including some plant cells (e.g. RSC Adv., 2017,7, 33459-33465, Journal of Fluorescence, 2017, 27(4), 1495-1503.) and animal cells including mammalian cells (e.g. Hill et al., Nanoscale, 2016, 8, 18630; Hill et al., Beilstein J. Org. Chem., 2017, 13, 675-693). Semiconductor quantum dots (QDs) are also known and have been demonstrated to be taken up into biological cells. (Angew. Chem. Int. Ed. 2014, 53, 810-814.)

In addition the formation of carbon nanoparticles using a microwave synthesis and their surface passivation with PEG200 is described by Zhu et al. in Chem. Commun., 2009, 5118-5120. However as noted above, there remains a need for a system to easily and reliably transport nucleic acids into plant cells and, desirably, to effect gene expression in the plant cell and also to effect (improve) the rate of photosynthesis.

SUMMARY OF THE INVENTION

In the light of the above-mentioned challenges, the present inventors have developed a novel system using carbon nanodots (CNDs), typically amine-terminated PEG-functionalised fluorescent CNDs, as carriers of nucleic acid cargos to generate a new, flexible, quick and robust method for plant transformation and genome editing. Carbon nanodots (also known as carbon quantum dots or carbon nanolights) are a new class of carbon nanomaterial typically with a size of 20 nm or below. Due to their inherent fluorescence the CNDs can be easily tracked, and their uptake and systemic transport throughout the plant visualised by confocal microscopy.

The CNDs are non-toxic and inexpensive to synthesise. CNDs are shown herein to be taken up by the plant through a variety of routes, including via the roots, via the foliage when applied as a spray, or via the seed coat after a simple dipping of the seed. CNDs can be combined with nucleic acids ("NAs") (such as DNA plasmids) to form "nanoplexes", which are taken up through the same routes, transported throughout the plant tissue and the associated DNA successfully delivered such that reporter gene expression occurs. This technology appears to be 'universal' and able to transform a wide variety of plants including genetically recalcitrant lower (*Selaginella*) and higher plants (*Begonia, Primula*), model plants (*Arabidopsis*) and crops (wheat, tobacco, sorghum, maize, soybean).

The carbon nanodot-nucleic acid "CND-NA" nanoplex system has not only the potential of the clay nanosheet system discussed above, but a significantly greater range of potential uses and several advantages. As well as being non-toxic and inexpensive, tracking of the systemic uptake and reporter gene expression of CND-NA nanoplexes, demonstrates that nucleotides of significantly larger size can be used (such as plasmids expressing reporter genes, as shown herein). In terms of the potential nucleic acid cargos, DNA is significantly cheaper to produce and more stable than dsRNA. An additional advantage of the CND-NA nanoplex system described herein is that nucleotide delivery (and editing) can happen 'in planta' i.e. when the tissue is on the plant with no need for tissue dissection or culture. This means that the system combines advantages of agrobacterium floral dip (which only works on a limited number of species) with the flexibility and tissue/species diversity of biolistic transformation. A further advantage is the ability to alter the functionalisation of the CNDs by changing molecules attached to the central fluorescent core.

The present CND nanoplexes can also deliver nucleic acids of a range of sizes, which means that a range of vectors and plasmids can be introduced using the CND-NA nanoplex system described herein. This includes plasmids encoding reporter genes and plasmids encoding a CRISPR/Cas9-gRNA complex. The present CND-NA nanoplex system is also capable of delivering GFP labelled CRISPR/Cas9-gRNA to the nucleus through both the seed soak and foliar spray method, this delivery resulting in gene editing. The present CND-NA nanoplex application and transformation method is effective in a wide range of plants and provides a straightforward, universal delivery system for genome editing in plants, streamlining the use of genomic editing in the plant sciences field. A further advantage of the present CND-NA nanoplex system lies in the relatively short timeframes involved compared to other transformation methods. For example using a foliar spray application in wheat, evidence both of nuclear targeted GFP-CRISPR/Cas9-gRNA and of gene editing resulting from this targeting was available within a week, rather than the usual three to five month timeframe required to obtain transgenic wheat plants.

Another technical effect of this invention is that, when functionalised with certain sugars, the inventors have found the CND compounds to enhance the efficiency of photosynthesis of both C3 and C4 plants. For instance, the inventors have found CND functionalised with glucose to be able to increase the rate of carbon assimilation and also the leaf area of both wheat (a C3 crop) and tobacco (a C4 crop). Without wishing to be bound by theory, the inventors believe that the CND compound may provide an alternative and more efficient electron transfer pathway within the photosynthetic machinery, possibly from photosystem II directly to ATP synthase. This would mean that a greater proportion of light captured would be transferred into photosynthate (and ultimately into biomass or crop yield) rather than dissipated through non-photochemical quenching. Evidence supporting this hypothesis includes the observation that CNDs bind weakly and interact with chlorophylls a and b, quenching the CD fluorescence in vitro; that there is an increase in light saturated maximum A ($A_{SAT}$) by the CD-treatments without a corresponding increase in high $CO_2$ maximum A ($A_{MAX}$) which demonstrates augmented operational efficiency whilst not enhancing maximum capacity; and the increased production of all measured pigments and a greater ratio of chlorophylls to carotenoids and chlorophyll-a to chlorophyll-b compared to the control. The CND treatment results in the plant producing more light-harvesting antenna, which absorb more light, and that this absorbed energy is transmitted more efficiently through the downstream pathways.

In one aspect, the present proposals relate to a method of modifying one or more characteristics of a plant, the method comprising contacting the plant with a carbon nanodot (CND) compound as defined herein; and then propagating the plant. In these proposals, the CND compound has the formula:

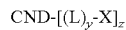

$$CND\text{-}[(L)_y\text{-}X]_z$$

in which:
  CND is a carbon nanodot having a diameter in the range 0.5-20 nm;
  L is a linker selected from $C_{1-20}$ alkylene, or $C_{1-20}$ alkenylene groups optionally including 1-5 heteroatoms selected from —O—, —N(H)—, and —S—;
  X is selected from:
    a) PEG-$(NR_2)_q$, in which each R is independently H or $C_{1-6}$ alkyl and the integer q is 0 or 1 and in which the PEG-$(NR_2)_q$ is optionally associated with a nucleic acid;
    b) a sugar moiety; and
    c) an $NR_2$ group, in which each R is independently H or $C_{1-6}$ alkyl
  wherein PEG is a polyethylene glycol having a weight average molecular weight (Mw) greater than 200
  the integer y is 0 or 1; wherein when y is 1, each of the CND and X moieties is attached to the L group either directly or via an amide bond; and
  z is an integer greater than or equal to 1.

In these proposals, the carbon nanodot compounds in which X is PEG-$(NR_2)_q$ are denoted in some instances herein as CND-PEG-$(NR_2)_q$.

As indicated by the integer y which is 0 or 1, the CND may be directly bonded to the PEG-$(NR_2)_q$ unit, for example by an amide bond, or a linker may be present between the CND core and the PEG-$(NR_2)_q$ group in a compound denoted CND-L-PEG-$(NR_2)_q$. [Unless explicitly stated, where the term CND-PEG-$NR_2$ or CND-PEG-$(NR_2)_q$ is used herein, the versions with the optional inclusion of a linker, i.e. CND-L-PEG-$NR_2$ and CND-L-PEG-$(NR_2)$ may be used as an alternative]. These proposals also relate to compositions comprising a plurality of such carbon nanodot compounds.

In the $NR_2$ unit of the PEG$(NR_2)_q$ groups (option b) above) or the $NR_2$ unit of option c) above, the R groups are each independently selected from H or $C_{1-6}$ alkyl units. In some preferred cases each R is independently selected from H or $C_{1-3}$ alkyl, most preferably both R units are H to form an $NH_2$ group.

In these proposals, the three options for X denoted a), b), and c) above are distinct and separable options, all of which are useful in the methods described herein for modifying one or more characteristics of a plant. In some cases, X is preferably option a). In some cases, X is preferably option b). In some cases, X is preferably option c).

Where these proposals relate to CND compounds in which the PEG-$(NR_2)_q$ is present, the PEG-$(NR_2)_q$ unit may, in some cases, be associated with a nucleic acid (NA). Preferably the PEG-$(NR_2)_q$ unit is associated with a NA. These "nanoplexes" are defined herein as including the nucleic acid associated with the PEG-$(NR_2)_q$ and are shown to be useful in a variety of methods for delivery of the nucleic acid into plant cells.

Herein the discussion of the PEG-$(NR_2)_q$ unit being "associated with" a nucleic acid describes a situation in which the nucleic acid is immobilised, or carried, by the PEG-(NR$_2$)$_q$ unit. Without being bound by theory, this association is thought to be due to Van der Waals forces rather than covalent bonding. Such association of nucleic acids with PEG units is known to a skilled reader. This association of a NA with the PEG-(NR$_2$)$_q$ unit(s) allows the CND compounds to carry the NA into a plant cell when the CND compound according to the invention is contacted with a plant as described herein. It is thought that the PEG unit should be preferably terminated by a chemical group that can be protonated so that it can become charged to bind to the nucleic acid but it can also deprotonate under appropriate conditions. This results in environment-dependent binding of the NA. It is most preferred that the PEG-(NR$_2$)$_q$ group is PEG-(NH$_2$) and it is found those compounds exhibit particularly preferable NA binding.

These proposals encompass methods of forming the CND compounds, methods of forming the nanoplexes and methods of using them to deliver of a nucleic acid into a plant cell.

The method of forming the CND compounds comprises reacting a known CND-NH$_2$ core (prepared by existing methods, see for example Hill et al., Nanoscale, 2016, 8, 18630) with an acid anhydride to form CND-COON, and subsequently reacting the CND-COON with PEG diamine to form CND-PEG-NR$_2$. An optional additional step of reacting the CND-COON compound with an amino acid linker (L) to form a CND-L-COOH may be included before subsequent reaction of the CND-L-COOH compound with PEG diamine to form a CND-L-PEG-NR$_2$ compound.

These proposals also include a CND-PEG-NR$_2$ or CND-L-PEG-NR$_2$ compound formed by a method described herein.

These proposals also provide a CND compound having the formula:

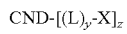

in which:
CND is a carbon nanodot having a diameter in the range 0.5-20 nm;
L is a linker selected from C$_{1-20}$ alkylene, or C$_{2-20}$ alkenylene groups optionally including 1-5 heteroatoms selected from —O—, —N(H)—, and —S—;
X is PEG-(NR$_2$)$_q$ optionally associated with a nucleic acid, in which each R is independently H or C$_{1-6}$ alkyl and the integer q is 0 or 1;
wherein PEG is a polyethylene glycol having a weight average molecular weight (Mw) greater than 200,
the integer y is 0 or 1; wherein when y is 1, each of the CND and X moieties is attached to the L group either directly or via an amide bond; and
z is an integer greater than or equal to 1.

Also provided is a plant comprising such a CND compound.

As noted above, some embodiments of this invention provide a CND compound comprising a PEG element that is associated with a nucleic acid. In some embodiments, the nucleic acid encodes one or more elements of a gene editing system. Gene editing systems can use nucleases and other factors to genetically editing the transformed cell, for instance by introducing an exogenous expression cassette into the genome of the plant. In some instances, the gene editing system can replace a native plant gene (or part of a native plant gene) with a modified version of that gene (or part of gene). In some embodiments, the gene editing system is the CRISPR/Cas9 system.

In some embodiments, the nucleic acid delivered by the methods and compositions of this invention encodes a gene product that protects the plant from disease. The nucleic acid may express a marker, for instance a fluorescent protein such as GFP. The nucleic acid may express a marker as well as expressing other elements such as a gene editing system and/or another transgene.

In embodiments in which X is a sugar moiety, the sugar moiety may be selected from glucose, maltose, and lactose. Preferably, the concentration of solutions or suspensions comprising the CND compound is no more than about 100 μg/mL.

The methods of the invention can increase plant biomass and/or crop yield. As described herein, increased growth has been shown for PEG-functionalised CND and for sugar-functionalised CND (i.e. when X is PEG-(NR$_2$)$_q$ or when X is a sugar moiety). Increased growth is also shown for CND "cores" (i.e. where X is an NR$_2$ group). Increased crop yield can alternatively be expressed as increased productivity. Increased crop yield can include increased seed count per plant, increased ear weight per plant, increased average seed weight, and/or increased shoot biomass.

The plant can be contacted with the CND compound in various ways. For instance, the plant can be contacted by (a) spraying the leaves of the plant with a solution or suspension of the CND compound; by (b) dipping the plant flower into a solution or suspension of the CND compound, and/or by (c) contacting the roots of a plant with a solution or suspension comprising the CND compound.

In preferred embodiments of this invention, the plant to be treated with the CND compound is a crop. For instance, crops such as wheat, tobacco, sorghum, maize, soybean and rice can be used with the methods and compositions of the invention.

In preferred embodiments of this invention, the CND treatment results in enhanced photosynthesis in a plant. While effective CND uptake has been observed in an extremely wide range of plants including lower plants such as lycophytes as well as both monocots and dicots, the impact of the CND treatment is most easily demonstrated with crops with a high biomass partition into yield (harvest index) such as wheat, rice, peanut, sugar beet, sweet potato, maize, sunflowers, soybean and sorghum.

In some aspects, the invention provides a modified plant that has been produced by the methods of this invention. Various plant characteristics are amenable to modification using these methods. In some embodiments, the modified plant exhibits an increased growth rate compared to plants of the same species that have not been contacted under comparable conditions with the CND compound. In some embodiments, the one or more modified characteristics includes increased seed count per plant, increased ear weight per plant, increased average seed weight, and/or increased shoot biomass. In some embodiments, the one or more modified characteristics includes increased plant biomass, disease resistance, salinity resistance, and/or temperature tolerance. In some embodiments, the one or more modified characteristics includes modified (e.g. enhanced) nutritive value, for instance modified sugar production, modified lipid production, modified vitamin production and/or modified protein production. The modified (e.g. enhanced) characteristics can be determined by comparison with an average plant of the same species that has not been contacted with the CND compound and that has been growing under essentially the same conditions for essentially the same length of time.

The modified plant of the invention may have a greater leaf area and/or greater biomass than an average plant of the same species that has not been contacted with the CND compound and that has been growing under essentially the same conditions for essentially the same length of time. Hence, the invention can increase the yield of crops.

In some aspects, the invention provides methods of producing a genetically modified plant. These methods comprise either (a) contacting a seed with a carbon nanodot (CND) compound; and then growing the seed to produce the genetically modified plant; or (b) contacting a plant with a carbon nanodot (CND) compound and propagating the plant. The CND compound used in this aspect has the formula:

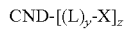

in which:
CND is a carbon nanodot having a diameter in the range 0.5-20 nm;
L is a linker selected from $C_{1-20}$ alkylene, or $C_{1-20}$ alkenylene groups optionally including 1-5 heteroatoms selected from —O—, —N(H)—, and —S—;
X is PEG-$(NR_2)_q$ optionally associated with a nucleic acid, in which each R is independently H or $C_{1-6}$ alkyl and the integer q is 0 or 1;
wherein PEG is a polyethylene glycol having a weight average molecular weight (Mw) greater than 200,
the integer y is 0 or 1; wherein when y is 1, each of the CND and X moieties is attached to the L group either directly or via an amide bond; and
z is an integer greater than or equal to 1.

The modified plant produced according to this aspect of the invention may produce a desired product that is not produced in plants of the same species that have not been contacted under comparable conditions with the CND compound. In other words, this invention can be used to engineer plants to produce desired products that are not usually produced in a particular type of plant. The invention can also be used to engineer plants to produce greater quantities of a product that is endogenously produced by plants of that species. Similarly, this invention can be used to engineer crops that produce a particular product (e.g. a vitamin or other nutrient) in the edible part of the crop. The product may or may not be produced by the plant ordinarily; in some embodiments the invention is used to increase the production of the product.

In related aspects, this invention provides methods of producing a desired product, by modifying a plant as described herein; and then harvesting all or part of the modified plant, and extracting the desired product.

In some embodiments, the modified plant of the invention produces a desired protein. The desired protein may be an exogenous protein, i.e. a protein that is not produced in plants of the same type that have not been subject to the methods of the invention. Alternatively, the desired protein may be an endogenous protein, i.e. a protein that is ordinarily produced in plants of the same type. Where the desired protein is an endogenous protein, the plant of the invention may be modified to produce the endogenous protein in greater quantities, or to produce the endogenous protein in a desired region of the plant (e.g. an edible part) in useful quantities.

In related aspects, the invention provides products (e.g. proteins) produced by the methods of the invention. In some embodiments, the invention provides products (e.g. proteins) that have been extracted from the modified plant of the invention.

The method of forming the nanoplexes comprises mixing a CND compound described herein in which X is PEG-$(NR_2)_q$ with a nucleic acid cargo in aqueous solution. This allows the nucleic acid to associate with the PEG-$(NR_2)_q$ chains to form a nanoplex which may be denoted CND-PEG-$(NR_2)_q$/NA.

Various methods of using the nanoplexes to deliver a nucleic acid cargo into a plant cell are described herein. These include application of an aqueous solution of the nanoplexes to a surface of the plant (e.g. leaf surface, root surface, stem surface), such as by spraying an aqueous solution onto the plant; and applying the aqueous solution of the nanoplexes to the plant seeds prior to germination and/or culturing. A method wherein the aqueous solution of the nanoplexes is applied to the plant roots may comprise uprooting the plant to apply the solution or, preferably, may comprise formulating the nanoplexes into a solid body that is subsequently inserted into the growth medium in the proximity of the roots allowing moisture in the growth medium to form the aqueous solution of nanoplexes that then reaches the root surface by capillary action through the growth medium.

The present methods may further comprise optional additional steps selected from: germinating a seed that has been treated with nanoplexes discussed herein; culturing/propagating a plant that has been treated with nanoplexes discussed herein; and harvesting a plant that has been treated with nanoplexes discussed herein.

These proposals also encompass a kit comprising the CND compounds as defined herein and a nucleic acid. Such kits are useful in the methods of delivery of the nucleic acid to plant cells as discussed herein.

In a further aspect the present proposals relate to a CND-$NH_2$ compound or a CND compound as described herein for use as an algaecide.

In a further aspect the present proposals relate to either a CND-$NH_2$ compound, or a CND compound as described herein, for use in enhancing photosynthesis in a plant.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Figure 1:
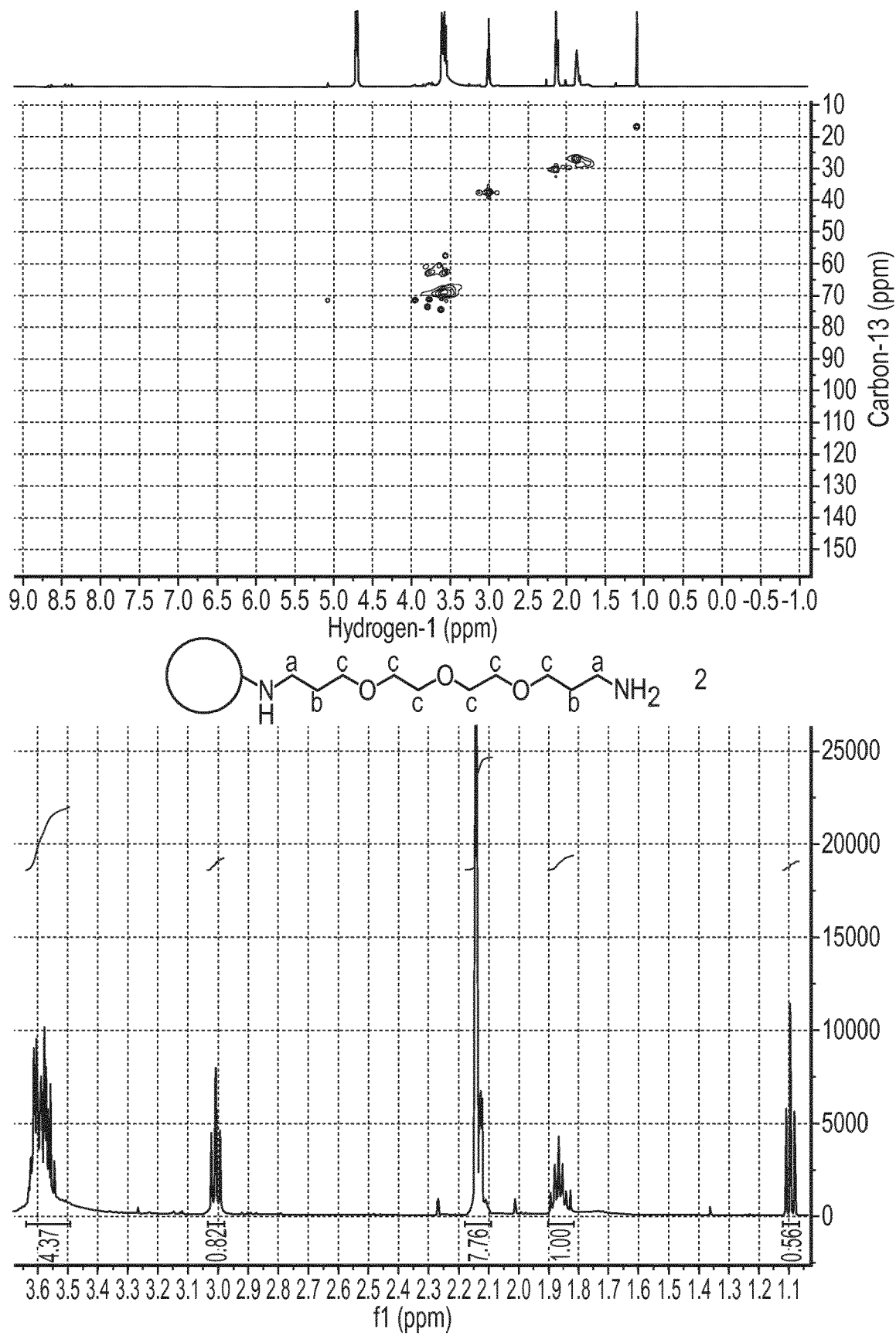
FIG. 1. NMR spectra of the core-CNDs. The 1-H (top) and HSQC (bottom) NMR spectra of the core-CDs. δ: 3.68-3.49 (m, 16H, H-c), 3.01 (t, J=7.2 Hz, 4H, H-a), 2.14 (d, J=0.7 Hz), 1.93-1.81 (q, 4H, H-b), 1.09 (t, J=7.1 Hz).
Figure 2:
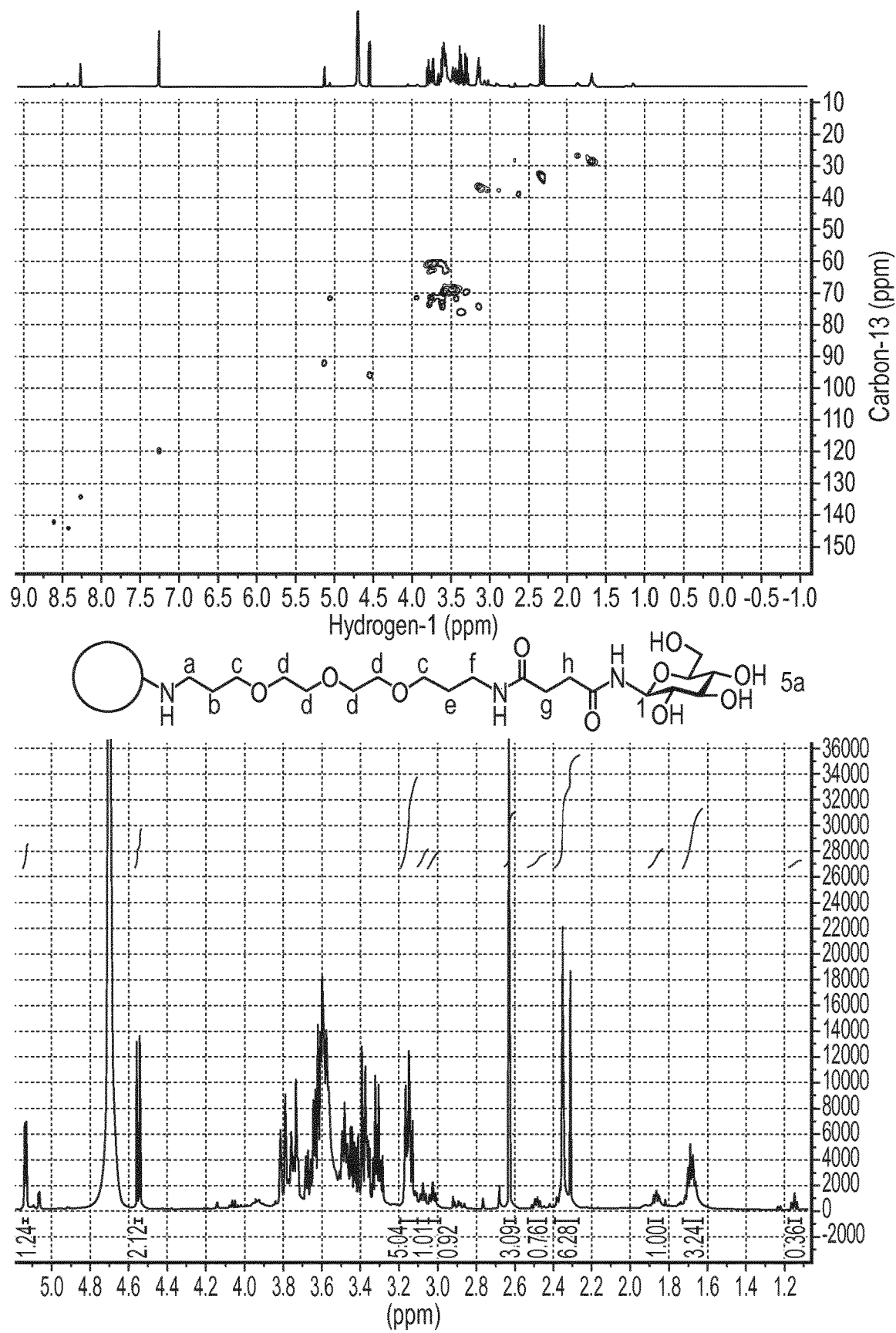
FIG. 2. The 1-H (top) and HSQC (bottom) NMR spectra of the glucose-CDs (i.e. CND compounds of the present invention in which X is glucose and L is a linker formed from TTDDA). δ: 5.14 (d, J=3.8 Hz, 1H, H-1), 4.55 (d, J=7.9 Hz, 1H, H-1), 3.58-3.25 (t, 12H, H-c, and H-d), 3.20-3.11 (t, 2H, H-f), 3.14-2.97 (t, 2H, H-a), 2.33 (t, J=20.9 Hz), 1.91-1.79 (t, 2H, H-b), 1.69 (p, J=6.6 Hz, 2H, H-e).
Figure 3:
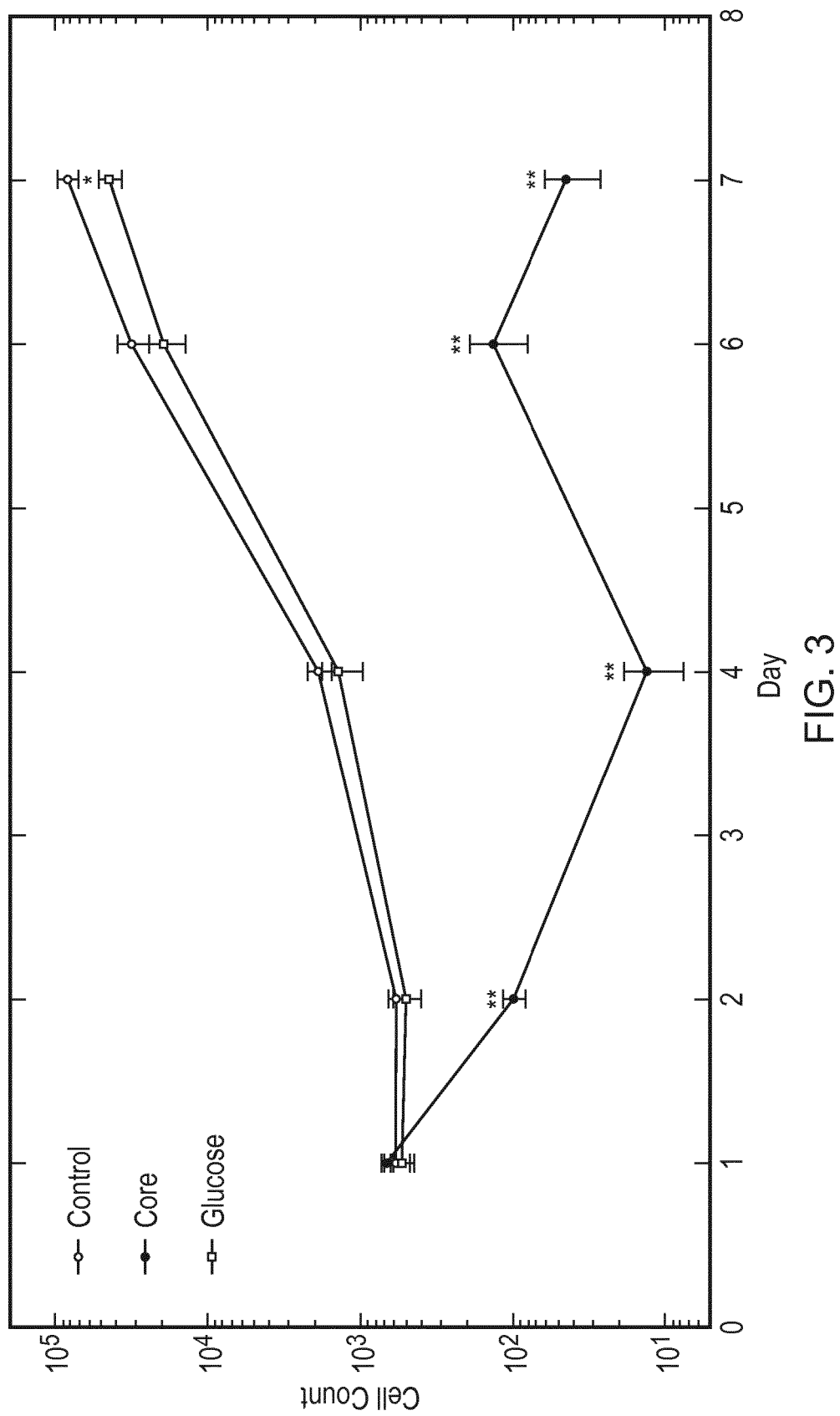
FIG. 3. Cell count in live algal cells containing chlorophyll (per ml).

Aspects and embodiments of the present invention will now be discussed with reference to the accompanying figures. Further aspects and embodiments will be apparent to those skilled in the art. All documents mentioned in this text are incorporated herein by reference.

The present proposals discuss carbon nanostructures and the use thereof in methods as described herein. The carbon nanostructures used in these proposals are referred to herein as "carbon nanodots" (CNDs), or "carbon dots" (CDs). The structure of the CNDs is preferably predominantly $sp^3$ hybridised carbon atoms although some degree of $sp^2$ hybridisation may also be present (e.g. less than about 25%). Typically the CNDs have a crystalline core of $sp^3$ hybridised material with a surface layer that is formed from amorphous carbon and may include embedded aromatic and/or polyaromatic carbon regions.

The CNDs used herein are particulate and approximately spherical. For example, they may have an aspect ratio (longest dimension/shortest dimension) of between 5 and 1, preferably between 3 and 1, preferably between 2 and 1, most preferably about 1. These aspect ratios distinguish the CNDs from carbon nanotubes and carbon flakes or graphene sheets all of which have a significantly higher aspect ratio. The CNDs used herein have an effective particle diameter, e.g. as measured by laser diffraction, of less than or equal to 20 nm, preferably less than or equal to 15 nm, preferably less than or equal to 10 nm, more preferably less than or equal to 8 nm. Above about 20 nm, the benefits associated with the present particles start to diminish. There is no particular lower limit on the effective particle diameter, however, as a preference, the particles are typically larger than 0.5 nm, or larger than 1 nm, or larger than 2 nm. A preferred effective diameter range for the CNDs of the present proposals is 2 nm to 10 nm, or 2 nm to 8 nm. Preferably the CNDs are monodisperse.

In preferred aspects, the CNDs are formed as described by Hill et al. (Nanoscale, 2016, 8, 18630). This method of making the CNDs provides CNDs that are surface functionalised with amine groups (also denoted "CND-$NH_2$" or "CND cores" or simply "cores" herein). During the formation process, the surface of the CNDs may be "passivated" by attachment of a compound that forms the basis of a linker L, typically using a diamine compound such as 4,7,10-trioxa-1,13-tridecanediamine (TTDDA). This passivation compound provides the amine functional groups at the surface of the CND-$NH_2$ compounds. Other diamine compounds may alternatively be used for the passivation step. These CND-$NH_2$ compounds can be converted to acidic —COON groups by known methods (e.g. reaction with an acid anhydride).

Subsequent reaction with a further amine can then be used to form an amide bond to link further groups, such as polyethylene glycol amines, to the CNDs as discussed below.

The CND-$NH_2$ core compounds produced by these methods are typically composed primarily of the elements carbon, oxygen, nitrogen, hydrogen and chlorine. In particular, the carbon content of the CND-$NH_2$ compounds is preferably at least 25%, preferably at least 30%, preferably at least 35%, preferably at least 40%, more preferably at least 45%. Most preferably the carbon content of the CND-$NH_2$ compounds is at least 35%. [% values from elemental analysis as mass fractions]. In some embodiments, the carbon content is about 38%. Incidental or minor impurities other than C, N, H, and O may be present, preferably at a level below 10 wt. %, preferably below 5 wt. %, more preferably below 2 wt. %, more preferably below 1 wt. % or below 0.5 wt. %. An example of such an impurity may be Cl if the process of Hill et al. noted above is used.

The CND cores formed by the process described by Hill et al. (ibid) have a specific composition in terms of levels of $sp^3$ and $sp^2$ hybridisation of the carbon atoms in the core. Typically the CND cores have an $sp^3$ hybridised crystalline inner carbon core with a more disordered outer surface containing other elements, typically residual from the synthesis process. For example, the overall CNDs may contain carbon (>45%), oxygen (20-32%), nitrogen (<9%), hydrogen (<9%) and chlorine (<7%). As noted in Hill & Galan (Beilstein J. Org. Chem., 2017, 13, 675-693) different methods for formation of CNDs result in different properties of the resultant CND product. Therefore, the present proposals include functionalized CND compounds (including CND-$NH_2$, CND-PEG-$NR_2$ and CND-PEG-$NR_2$/NA) in which the CND core is formed by the microwave assisted degradation of a carbohydrate (such as glycosamine, e.g. glycosamine HCl) in the presence of a diamine passivating compound (such as 4,7,10-trioxa-1,13-tridecanediamine (TTDDA)).

Carbon nanodots provide a useful delivery vehicle for delivering a nucleic acid cargo into a cell because the CNDs themselves are known to be non-toxic. This is in contrast to some known nanoparticles formed from other materials (e.g. CdSe) and may also be an advantage over high aspect ratio structures such as carbon nanotubes which have been shown to possess harmful properties under some conditions such as being capable of producing inflammation, epithelioid granulomas (microscopic nodules), fibrosis, and biochemical/toxicological changes in the lungs (Lam et al., Critical reviews in Toxicology, 2006, 6(3), 189-217).

In some embodiments the CNDs used in the present proposals are functionalised with one or more polyethylene glycol (PEG) amine groups (-PEG-$(NR_2)_q$ in the CND compounds defined herein). The length of the PEG chains used in the present proposals is important. The PEG amine groups are thought to provide a substrate with which the nucleic acid intended for delivery to the target cell interacts and associates. This interaction between PEG amine chains and nucleic acids is known and is typically explained in terms of an electrostatic interaction between the PEG amine and the nucleic acid. The PEG amine groups used in these proposals have a weight average molecular weight (Mw) Daltons, Da) greater than 200, preferably greater than 500. The upper limit of molecular weight (Mw) is not particularly limited. However, it is preferred that the Mw is below 100,000, preferably below 50,000, preferably below 20,000. In preferred aspects the molecular weight range of the PEG amine units used in the present proposals is between 200 and 100,000, preferably between 200 and 50,000, preferably between 200 and 20,000, preferably between 500 and 5,000, such as about 1,000.

The geometry of the PEG-amine is not particularly limited. It may be, for example, selected from straight chain, branched, star, or comb geometry. Preferably the PEG amine has a straight chain geometry.

The attachment of the PEG amine groups to the CND may be via an amide bond linkage formed by reaction of a —COON group on the CND surface (the —COON group formed as discussed above) with one amine unit of a PEG diamine. Alternatively, as noted above, the attachment may be via a linker L. If present the linker may be formed from a diamine compound or amino acid compound. In the case of a diamine linker, the linker may be attached to a —COON group on the CND (formed as outlined above) by reaction of one of the amine units to form an amide bond. The second amine unit of the diamine is then converted into a —COON group (e.g. by reaction with an acid anhydride as noted above) to provide a —COON moiety with which an amine unit of a PEG amine (e.g. a PEG diamine) can then react to attach the PEG unit via an amide bond. In the case of an amino acid linker, the linker L is attached directly to the CND by reaction of the amino moiety of the amino acid with an acid group on the CND unit to form an amide bond. The acid moiety of the amino acid can then be used to attach a PEG unit as noted herein by attachment to an amine unit on the PEG moiety.

The linker is typically a short chain (e.g. 20 atom backbone or less) linker. Examples of this linker include straight or branched chain units selected from $C_{1-20}$ alkylene, and $C_{1-20}$ alkenylene each of which may contain one or more heteroatoms selected from —O—, —N(H)—, and —S—, preferably —O—. In preferred aspects L is selected from $C_{3-20}$ alkylene and $C_{3-20}$ alkenylene units, preferably $C_{3-20}$ alkylene units, each of which may contain one or more heteroatoms selected from —O—, —N(H)—, and —S—, preferably —O—. In some aspects L is a $C_{3-20}$ alkylene, preferably $C_{8-18}$ alkylene, unit which may contain one or more heteroatoms selected from —O—, —N(H)—, and —S—, preferably —O—. Preferably L is a $C_{3-20}$ polyether unit. Preferably L is selected from 4,7,10-trioxa-1,13-tridecane, or 15-oxo-4,7,10-trioxa-14-azaoctadecane.

For example, the linker may be formed from 4,7,10-trioxa-1,13-tridecanediamine (TTDDA), or monoamine containing linkers such as 1-amino-15-oxo-4,7,10-trioxa-14-azaoctadecan-18-oic acid or aminoacids (e.g. β-alanine).

In the formulae presented herein for the CND compounds, the integer z is greater than or equal to 1 indicating that one or more surface functionalizations with $-(L)_y-X$ units may be included. Typically z is greater than 1.

The integer y is 0 or 1 indicating that the linker unit may be present or absent. In situations where y=0, the CND is bonded directly to the X unit. Where y=1 the linker L is present. When y=1, the attachment of each of the CND and X moieties to the L group is either a direct bond or is via an amide bond. In situations where X is $PEG-(NR_2)_q$, it is preferred that when y=1, L is attached to each of the CND and X via an amide bond. In situations where X is a sugar moiety, it is preferred that y=1 and it is independently also preferred that L is attached to each of the CND and X via an amide bond.

The integer q is 0 or 1 indicating that the PEG unit may or may not have an amine termination. Preferably q=1.

The CND compounds are used to prepare nanoplexes which include the CND compound wherein the PEG unit (preferably the $PEG-(NR_2)_q$ unit but possibly, alternatively, the linker L if that forms a polyethylene glycol moiety) is associated with the nucleic acid cargo that is to be delivered into a plant cell. The exact ratio of CND compound to nucleic acid cargo will depend on a number of factors such as, among others, the length of the PEG chain, structure of the PEG chain, nature of the nucleic acid cargo, and intended use of the nanoplexes (e.g. mode of application to the plant cells). Preferably the ratio of CND compound to nucleic acid cargo is a 1:1 molar ratio.

The nucleic acid cargo is believed to interact electrostatically with the PEG units attached to the CND core such that when the core is taken up into a plant cell, the nucleic acid cargo is transported into the cell as well.

The method of forming the CND compounds described herein may comprise the steps of:
Microwave assisted degradation of a carbohydrate compound in the presence of a surface passivating diamine to form a carbon nanodot amine (CND-NH$_2$) compound;
Reaction of the CND-NH$_2$ compound with an acid anhydride to form a CND-COON compound; and
Reaction of the CND-COON compound with a PEG diamine to form the CND-PEG-NR$_2$ compound.

The first two steps of the reaction are known, e.g. see Hill et al. (ibid). The PEG diamine used in this method is a PEG group as described herein having at least two amine functional groups.

The method of forming the CND compounds described herein may alternatively comprise the steps of:
Microwave assisted degradation of a carbohydrate compound to form a carbon nanodot CND; and
Surface passivation with a $H_2N-PEG-(NR_2)_q$ compound to form the $CND-PEG-(NR_2)_q$ compound.

The method of forming the nanoplex of the present proposals comprises mixing a CND compound as described herein wherein X is $PEG-(NR_2)_q$, with a nucleic acid cargo, preferably in a 1:1 molar ratio, in aqueous solution.

The CND compounds described herein have been shown to be useful in the delivery of a nucleic acid into plant cells. These compounds have been shown to have the surprising ability to be taken up by plant cells on simple surface contact. Also surprisingly, the CND compounds themselves are taken up into the plant cells carrying the nucleic acid cargo along with them. The CNDs described herein have the advantage of exhibiting strong fluorescence which allows the uptake of the CND compounds (including the nucleic acid cargo where present) to be easily observed by standard fluorescence imaging techniques.

The present proposals represent a new delivery system with the ability to deliver a range of different nucleic acid cargos into plant cells. These materials and methods described herein have the advantages of avoiding physical delivery methods that can result in damage to the plant cells (such as biolistics, electroporation, or microinjection) and are simpler and more targetable than biological delivery methods (such as agrobacterial delivery) that cannot be easily targeted to individual plants or sections of a plant crop.

The delivery of the nucleic acid cargo to the plant cells has been shown herein to result in transient transfection and is also proposed for stable germline transfection.

The CND compounds of the present invention, in particular where X is a sugar moiety, but also where X is $PEG-(NR_2)_q$, have been surprisingly shown to enhance photosynthesis in plant on contact with the plant. This effect has also been surprisingly demonstrated with the CND cores (CND passivated with a diamine used to form linker L, e.g. TTDDA, i.e. where X is NH$_2$). However the benefits achieved with CND compounds of the present invention, in particular where X is a sugar moiety (particularly glucose, maltose, or lactose) are greater those with the CND cores. These effects are illustrated by carbon assimilation data, PPFD measurements, and $CO_2$ uptake measurements. These measurements demonstrate an increase in the rate of photosynthesis in plants contacted with CND compounds of the present invention as compared to plants of the same species that have not been contacted under comparable conditions with the CND compound. It is notable that this effect is demonstrated herein in both wheat and tobacco plants which shows that the effect is achieved in species having significantly different metabolic pathways. In particular this diversity indicates that this effect would be expected to be achieved in a range of different plants, for example in both C3 and C4 plants, and in both monocots and dicots.

This increased rate of photosynthesis may, in some exemplary cases be accompanied by one or more of an increase growth rate of the plant, an increase in crop yield, a greater leaf area, and/or greater biomass as compared to plants of the same species that have not been contacted under comparable conditions with the CND compound.

In the most general method or contacting the CND compounds with a plant, an aqueous solution of the CND compound is applied to part of the plant. For example, by a method selected from application to the surface of the leaves or stem (e.g. by spraying), application to the surface of the roots (e.g. by using the aqueous solution to water the plant or by placing a pellet containing the CND compound in the growing medium near to the roots).

The concentration of the CND compound in the aqueous solution may vary, e.g. between about 1 mg/mL and about 100 mg/mL, but is typically about 20 mg/mL. For the improvements in photosynthesis, the concentration is preferably below 100 mg/mL. Above 100 mg/mL the plant exhibits a negative response to the higher concentration of CND compound and the beneficial effects of the present invention are impaired, even to the extent of causing damage to the plant.

When applied by leaf spray, the methods include spraying of the plant with CND compound spray solution typically until the leaves are dripping with the solution. Depending on the size of the plant, this may include application of between about 5 ml and 50 ml of CND compound spray solution per plant, typically about 20 ml per plant. In any case, the plant is sprayed until dripping wet.

In some methods the CND compound solution is applied to the plant cells (leaf, seed, root etc.) multiple times to increase the uptake of the CND compounds. For example, the solutions may be applied 1 to 4 times per day (e.g. twice a day) for 1-7 days (typically 4 days). However this multiple application of the solution is simply to increase uptake; the results mentioned herein are still observed with only a single application.

Nucleases and Gene Editing

The methods and CND compounds and compositions of this invention can be used to deliver nucleases and/or other components suitable for genetically editing the transformed cell. Any suitable targeting nuclease can be used including, for example, zinc-finger nucleases (ZFNs), transcription activator-like effector nucleases (TALENs), clustered regularly interspaced short palindromic repeat (CRISPR) nucleases, meganucleases, other endo- or exo-nucleases, or combinations thereof. These nuclease systems can be used to delete from, insert into or replace sequences of the host cell genome. The skilled reader will understand that a desired gene can be expressed in the host cell by insertion of an appropriate gene expression cassette, comprising a nucleic acid sequence encoding the desired gene operably linked to an appropriate promoter.

CRISPR methodologies employ a nuclease, CRISPR-associated (Cas9), that complexes with small RNAs as guides (gRNAs) to cleave DNA in a sequence-specific manner upstream of the protospacer adjacent motif (PAM) in any genomic location. CRISPR may use separate guide RNAs known as the crRNA and tracrRNA. These two separate RNAs have been combined into a single RNA to enable site-specific mammalian genome cutting through the design of a short guide RNA. Cas9 and guide RNA (gRNA) may be synthesized by known methods. Cas9/guide-RNA (gRNA) uses a non-specific DNA cleavage protein Cas9, and an RNA oligo to hybridize to target and recruit the Cas9/gRNA complex. See Chang et al., 2013, Genome editing with RNA-guided Cas9 nuclease in zebrafish embryos, Cell Res 23:465-472; Hwang et al., 2013.

CRISPR (Clustered Regularly Interspaced Short Palindromic Repeats) is found in bacteria and is believed to protect the bacteria from phage infection. It has recently been used as a means to alter gene expression in eukaryotic DNA, by introducing insertions or deletions as a way of increasing or decreasing transcription in the DNA of a targeted cell or population of cells. See for example, Horvath et al., Science (2010) 327:167-170; Terns et al., Current Opinion in Microbiology (2011) 14:321-327; Bhaya et al. Annu Rev Genet (2011) 45:273-297; Wiedenheft et al. Nature (2012) 482:331-338); Jinek M et al. Science (2012) 337:816-821; Cong L et al. Science (2013) 339:819-823; Jinek M et al. (2013) eLife 2:e00471; Mali P et al. (2013) Science 339:823-826; Qi L S et al. (2013) Cell 152:1173-1183; Gilbert L A et al. (2013) Cell 154:442-451; Yang H et al. (2013) Cell 154:1370-1379; and Wang H et al. (2013) Cell 153:910-918).

A nuclease is an enzyme capable of cleaving the phosphodiester bonds between the nucleotide subunits of nucleic acids. In a preferred embodiment of the invention, a nucleic acid encoding the Cas9 nuclease is incorporated into the compositions and methods of the invention, however, it should be appreciated that nucleic acids encoding other nucleases may be utilized.

In some embodiments of the invention, at least one genetic insertion is caused by the CRISPR/gRNA/Cas9 complex. In some embodiments, multiple insertions are made in the genome of the transformed cell. In some embodiments of the invention, insertions into the genome can be designed to cause expression of a heterologous gene. Additionally, insertions/deletions are also used to introduce a premature stop codon either by creating one at the double strand break or by shifting the reading frame to create one downstream of the double strand break. The changes introduced by the use of the CRISPR/gRNA/Cas9 system are permanent to the genome.

In some embodiments of the invention, at least one deletion is caused by the CRISPR/gRNA/Cas9 complex, to optionally prevent the expression of one or more genes in the target cell. Such applications find utility in preventing certain diseases, for instance by blocking viral gene expression. In some embodiments, the CRISPR/Cas9/gRNA system of the invention causes significant genomic disruption, resulting in effective destruction of a viral genome, while leaving the host genome intact.

TALENs use a nonspecific DNA-cleaving nuclease fused to a DNA-binding domain that can be to target essentially any sequence. For TALEN technology, target sites are identified and expression vectors are made. Linearized expression vectors (e.g., by NotI) may be used as template for mRNA synthesis. A commercially available kit may be use such as the mMESSAGE mMACHINE SP6 transcription kit from Life Technologies (Carlsbad, CA). See Joung & Sander, 2013, TALENs: a widely applicable technology for targeted genome editing, Nat Rev Mol Cell Bio 14:49-55.

TALENs and CRISPR methods provide one-to-one relationship to the target sites, i.e. one unit of the tandem repeat in the TALE domain recognizes one nucleotide in the target site, and the crRNA, gRNA, or sgRNA of CRISPR/Cas system hybridizes to the complementary sequence in the DNA target. Methods can include using a pair of TALENs or a Cas9 protein with one gRNA to generate double-strand breaks in the target. The breaks are then repaired via non-homologous end-joining or homologous recombination (HR).

Nucleic Acids, Vectors and Gene Expression Cassettes

Molecular biology techniques suitable for the producing nucleic acids used with the invention are well known in the art, such as those set out in Green & Sambrook, Molecular Cloning: A Laboratory Manual, New York: Cold Spring Harbor Press, 2012.

Following delivery into the host cell, a desired peptide or protein may be expressed by the nucleic acid.

To enable peptide/protein expression, the nucleic acid will comprise a nucleotide sequence that encodes the desired peptide or protein. The nucleotide sequence may be provided as part of a vector that persists in the cell, or may be incorporated into the genome of the cell, e.g. via a gene editing system such as CRISPR/Cas9.

A "vector" as used herein is an oligonucleotide molecule (DNA or RNA) used as a vehicle to transfer foreign genetic material into a cell. The vector may be an expression vector for expression of the foreign genetic material in the cell. Such vectors may include a promoter sequence operably linked to the nucleotide sequence encoding the gene sequence to be expressed. A vector may also include a termination codon and expression enhancers. Any suitable vectors, promoters, enhancers and termination codons known in the art may be used to express plant aspartic proteases from a vector according to the invention. Suitable vectors include plasmids, binary vectors, viral vectors and artificial chromosomes (e.g. yeast artificial chromosomes).

In this specification the term "operably linked" may include the situation where a selected nucleotide sequence and regulatory nucleotide sequence (e.g. promoter and/or enhancer) are covalently linked in such a way as to place the expression of the nucleotide sequence under the influence or control of the regulatory sequence (thereby forming an expression cassette). Thus a regulatory sequence is operably linked to the selected nucleotide sequence if the regulatory sequence is capable of effecting transcription of the nucleotide sequence. Where appropriate, the resulting transcript may then be translated into a desired protein or polypeptide.

Other Desired Products

Besides engineering plants to produce a desired transgenic peptide or protein (as described elsewhere herein), this invention can also be used to produce other desired products in the modified plant. For instance, the invention can be used to express a transgene that enables the modified plant to produce a desired product that is not produced by (or is not produced in sufficient quantity by) unmodified plants of the same type. Production of desired (non-protein) products by modified plants is well known: so-called 'golden rice' was produced by genetically engineering rice plants to synthesise beta-carotene in useful quantities in the edible parts of the crop. The present invention can be used to modify a plant to enable it to produce desired products such as pharmaceuticals, vitamins or industrial or pharmaceutical precursors.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

EXAMPLES

Materials and Methods—Carbon Nanodot (CND) Formation

Chemicals were purchased and used without further purification. Core CND formation was conducted in a domestic microwave (Tesco Homebrand) 700W. Concentration centrifugation tubes were GE Healthcare Life Sciences VIVASPIN 20 with a 10 kDa molecular-weight cut off (MWCO) filter. Kochetkov's amination of carbohydrates was conducted using Biotage Initiator+microwave reactor. 0.5-01 kDa MWCO Biotech Cellulose Ester membranes were used for dialysis. Extracts were concentrated under reduced pressure using both a Büchi rotary evaporator at a pressure of 15 mmHg (diaphragm pump) at room temperature. 1H and 13C HSQC NMR were measured in $D_2O$ at 500 MHz. All spectra were taken on a Bruker Advance III HD 500 Cryo. $^1H$ and $^{13}C$ NMR chemical shifts are quoted in parts per million (ppm) and referenced to the residual solvent peak (D20: 1-H=4.70 ppm). Coupling constants (J) given in Hertz. Multiplicities are abbreviated as: s (singlet), d (doublet), t (triplet), q (quartet), p (pentet) and m (multiplet). Assignments were made with the aid of HSQC NMR experiments. FTIR was conducted on a Bruker ATR. Zeta analysis was carried out using Malvern Instruments Nano-Z ZEN 2600. Fluorescence measurements were taken on a Perkin-Elmer LS45 in quartz cuvettes purchased from ThorLabs. Absorbance measurements were conducted on Cary UV-Vis 50 spectrophotometer in quartz cuvettes. Dynamic Light Scattering (DLS) measurements were made using a Malvern Instruments, Nano-S90 Red Laser Model ZEN1690. All measurements were made in HPLC-grade methanol. All data analysis was conducted using Matlab unless otherwise stated.

Materials and Methods—Plant Transformation

Plasmid DNA was supplied by The Arabidopsis Information Resource (TAIR) and by Professor Keith Edwards (University of Bristol).

Plasmid DNA was extracted using QIAGEN Miniprep kits, using the standard QIAGEN protocol. The DNA was eluted in autoclaved water rather than buffer.

For all plants 400 mL ½ MSO agar was prepared as instructed by the manufacturer (Sigma Aldrich, Dorset, UK) by mixing 0.88g Mirashige and Skoog (MS), 3.2 g Agar and 400 mL dH2O. This was autoclaved to sterilise and pipetted into hydroponics seed holders. These were allowed to set and seeds were pipetted onto the agar, one per holder.

Analysis

Figure 5:
FIG. 5. Photograph of wild-type wheat, no-spray control (left) and following repeated spray with PEG-functionalised CND carrying the PVKH plasmid (right). PVKH is a standard CaMV 35S GUS (β-glucuronidase) expressing plasmid. β-glucuronidase can be used as a reporter gene to catalyse activation of a detectable substrate.
Figure 6:
FIG. 6. Photographs of wild-type wheat, from left to right: no-spray control; CND control, PVKH control, CND+PVKH one spray, CND+PVKH repeated sprays.
Figure 6:

Application of CND compounds did not appear to have a detrimental effect on plant growth. On the contrary, increased growth rate was observed in many instances (see FIGS. 5 and 6 for instance).

Confocal Laser Scanning Microscopy

Setup

A Leica SP5 Confocal Microscope was used to image the fluorescent CNDs and fluorescent proteins from the plasmid DNA. The CNDs were imaged with the 405 nm UV laser under 415-470 nm wavelengths. Yellow fluorescent proteins (YFP) were imaged using Leica EYFP, 527-576 nm, with the Argon 514 nm laser at 15%. Green fluorescent proteins (GFP) were imaged using Leica EGFP, 488-540 nm, with the Argon 488 nm laser at 15%. Chlorophyll was imaged using the Argon 514 nm laser at 15%, 644-713 nm.

Imaging

Images were taken at 63× magnification with immersion oil. Image settings were optimised using wild type control samples.

YFP and GFP lasers were set at 1200 gain, the chlorophyll laser was set at 800 gain, ALEXA488 was set at 800 gain, and FLUO3 was set at 1000-1200 gain depending on the sample. The laser power and gain was kept consistent between control and experimental samples.

Fluorescence Microscopy

A Leica DM2000 LED microscope was used to examine samples, and images were taken on a Leica MC120 HD camera. A 365 nm wavelength was used to image CNDs, 470 nm to image GFP, and 530 nm was used to image YFP and chlorophyll. Settings were optimised using wild type control samples and kept consistent for all imaging.

GUS Staining

The GUS staining procedure was adapted from methods by Hayes et al. (PNAS (2014) 111(32) 11894-11899). Samples were washed three times in 50% EtOH every 12 hours and left in the final volume for two days to fully bleach the leaves.

Example 1

Passivated Carbon Nanodot Core Formation

Core synthesis

Glucosamine hydrochloride (1.00 g, 4.63 mmol) and 4,7,10-trioxa-1,13-tridecanediamine (TTDDA) (1.35 mL, 5.09 mmol) are mixed with 20 ml of ultrapure $H_2O$. The mixture is then heated under microwave irradiation (3 mins, 700 Watts). 20 mL of $CHCl_3$ are added to the oil obtained and sonicated for 10 min. and the $CHCl_3$ discarded. This process is repeated until the supernatant is clear.

The oil obtained after washing is then excluded using different conditions discussed below depending on the scale of the reaction.

Small Scale

This brown oil is then dissolved in 20 ml $ddH_2O$ and centrifuged through a 10,000 MWCO spin filter (GE Healthcare Life Sciences VIVASPIN 20, 5000 rpm, 1 hour.)

The sample was then passed through a 200 nm syringe filter and dialysed overnight against $ddH_2O$ at 0.5-01 kDa MWCO with Biotech Cellulose Ester membranes, replacing the $ddH_2O$ after the first couple of hours. The resulting solution was then freeze-dried to yield approximately ~1 g of core carbon dots.

Multigram scale

Method A

The brown oil is dissolved in distilled water and dialysed against ultrapure water in 10000 MWCO. The volume of the excluded fraction was reduced via lyophilisation, redissolved in ultrapure water and dialysed against ultrapure water in 500-1000 MWCO.

Method B

The combined batches were dissolved in distilled water purified via size exclusion column (G15) eluting with ultrapure water.

The resulting CNDs from either scale method have amine functional groups at their surface as a result of passivation with the diamine TTDDA in the synthetic method. These are denoted CND-L-$NH_2$ in the examples.

Example 2

CND Core Functionalisation and Nanoplex Formation

CND-L-COOH

Succinic anhydride (5 g) was added to a solution of CND-L-$NH_2$ (1 g) (obtained as in Example 1) in distilled water (50 mL). The mixture was reacted overnight. The reaction volume was reduced under vacuum and the CND-L-COOH were purified either via dialysis against ultrapure water overnight in 500-1000 MWCO; or via size exclusion column (G15) eluting with ultrapure water.

CND-L-PEG-$NH_2$

PEG1000-diamine (0.5 g) and 1-ethyl-3-(3-dimethylaminopropyl)carbodiimide (0.2 g) were added to a solution of CND-L-COOH (40 mg/mL) in distilled water (250 mL) and reacted overnight. The reaction volume was reduced under vacuum and the CND-L-PEG1000-$NH_2$ were purified either via dialysis against ultrapure water overnight in 1000-3000 MWCO; or via size exclusion column (G15) eluting with ultrapure water. [PEG1000 is polyethylene glycol having a weight average molecular weight of 1000 $g.mol^{-1}$].

In separate examples the PEG1000-diamine was replaced with PEG600 diamine and PEG2000-diamine to produce the corresponding CND-L-PEG-$NH_2$ compounds.

The PEG-functionalised CNDs were mixed with a selection of different nucleic acids to associate the NA with the PEG groups. 10 μL of the NA solution was used in each case. The volumes of the PEG-functionalised CND suspensions were as shown in the following tables. The nanoplexes were given a unique identifies code as shown in the following tables which corresponds to the labels in FIG. 20.

|  | Nucleic Acid | | | |
| --- | --- | --- | --- | --- |
| CND PEG1000 | 131Y (7 kbp) | YFP 229 (10 kbp) | PART127 (9 kbp) | 127T (7 kbp) |
| 5 μL | A1 | A2 | A3 | A4 |
| 10 μL | B1 | B2 | B3 | B4 |
| 20 μL | C1 | C2 | C3 | C4 |
| 40 μL | D1 | D2 | D3 | D4 |
| 60 μL | E1 | E2 | E3 | E4 |

| CND PEG2000 | Nucleic Acid | |
|---|---|---|
| | 127T (7 kbp) | 1T (7 kbp) |
| 5 µL | A6 | A7 |
| 10 µL | B6 | B7 |
| 20 µL | C6 | C7 |
| 40 µL | D6 | D7 |
| 60 µL | E6 | E7 |

| CND PEG600 | Nucleic Acid Cas9 |
|---|---|
| 5 µL | A8 |
| 10 µL | B8 |
| 20 µL | C8 |
| 40 µL | D8 |
| 60 µL | E8 |

Figure 20:
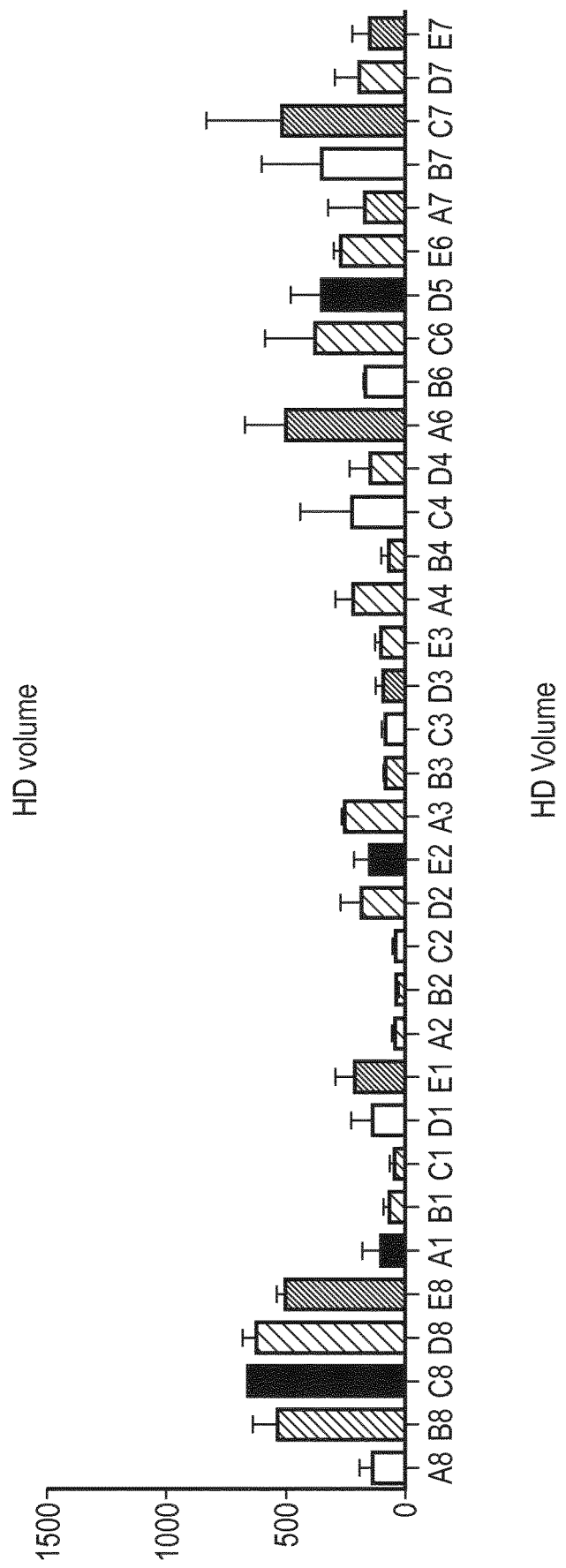
FIG. 20. Hydrodynamic radius measurements for CND-PEG(NH$_2$) nanodots associated with a variety of different nucleic acids as set out in Example 3. Results are shown for PEG600, PEG1000, and PEG2000.

The hydrodynamic volume measurements shown in FIG. 20 show that the nanoplexes using PEG1000 have a notably lower hydrodynamic radius than those using PEG2000 or PEG600. It is thought that smaller, more compact nanoplexes give more reproducible results so the lower hydrodynamic radius nanoplexes are preferred.

Example 3

Preparation of CND-Plasmid Polyplexes

Mixing Method 10 µL of CND-L-PEG1000-NH$_2$ (20 mg/mL) obtained as in Example 2, 10 µL of YFP229 plasmid, 130 µL of phosphate buffered saline (PBS), and 400 µL of ultrapure water were vortexed for 30s, and allowed to stand for 5min after which any analysis or experiment was conducted.

In separate examples the YFP229 plasmid was replaced with 131Y (7Kbp), PART27 (9Kbp), 127T (7Kbp), and 1T (7Kbp).
Precipitation Method
10 µL of CND-L-NH$_2$ (20 mg/mL) and 10 µL of Cas9 plasmid were vortexed for 30 s. The mixture was concentrated to dryness using a speed vacuum concentrator and stored. The solid was resuspended in ultrapure water prior any analysis or experiment was conducted.

Example 4

Transient Expression in Excised Leaves

Carbon Nanodot and DNA Incubation
60 µl Carbon nanodots as obtained in Example 2 (CND-L-PEG1000-NH$_2$), 60 µl plasmid DNA and 60 µl Tris-EDTA (TE) buffer pH 8.0 were added to a 2 mL sterile Eppendorf tube, vortexed for 30 seconds and left in the dark at room temperature for an hour to allow binding of the DNA. This created a CND-L-PEG1000-NH$_2$ and DNA nanoplex in TE buffer pH 8.0.
Before leaf incubation in the nanoplex solution, 280 µl of distilled water was added and vortexed for a further 30 seconds.
Plant Preparation
Arabidopsis, Begonia, and Selaginella plants were grown in hydroponics (Araponics). *Arabidopsis thaliana columbia* were grown in low density compartments to allow full leaf development. The water of the hydroponics was supplemented with autoclaved Hoagland's solution (0.5 g/L) pH 5.8 and was refilled with standard water twice a week. Further Hoagland's solution of the same concentration was added as required, based on plant condition.

Wheat plants were grown in hydroponics. *Triticum aestivum* cv. USU-*Apogee* were grown in high density compartments to allow full development. The water of the hydroponics was supplemented with autoclaved Hoagland's solution (0.5 g/L) pH 5.8 and was refilled with standard water twice a week. Further Hoagland's solution of the same concentration was added as required, based on plant condition.
Specimen Preparation
For Arabidopsis, Begonia, and Selaginella plants full basal leaves were cut from wild type plants. For wheat full leaves were cut from wild type plants.
An equal number of leaves were placed into one of four conditions in sterile 2mL Eppendorf tubes.
Condition 1 was nanoplex described above in distilled water and TE buffer pH 8.0;
Condition 2 was CND-L-PEG1000-NH$_2$ nanodots in distilled water and TE buffer pH 8.0;
Condition 3 was plasmid DNA in distilled water and TE buffer pH 8.0;
Condition 4 was distilled water and TE buffer pH 8.0.
The leaves were placed with the cut petiole in the solution. These were incubated at room temperature in the dark for 24 hours.

Example 5

Seed Transformation

Carbon Nanodot and DNA Incubation
Carbon nanodot and DNA incubation was performed as in Example 4 to provide the CND-L-PEG1000-NH$_2$ DNA nanoplex. However, the amounts of CND-L-PEG1000-NH$_2$, DNA and TE buffer pH 8.0 were increased to 85 µl to improve uptake in a more dilute end solution.
Specimen Preparation
MS Surface sterilised seeds were placed in 50 mL falcon tubes (Appleton Woods, Limited) with 25 mL liquid MS 4.3 g/L as recommend by the manufacturer and incubated at 22° C., shaking at 120 RPM with constant light for 24 hours.
The MS was removed and the seeds were separated into four 50 mL falcon tubes. 25 mL liquid MS was added to each under four separate conditions the conditions
Condition 1 was nanoplex described above in distilled water and TE buffer pH 8.0;
Condition 2 was CND-L-PEG1000-NH$_2$ nanodots in distilled water and TE buffer pH 8.0;
Condition 3 was plasmid DNA in distilled water and TE buffer pH 8.0;
Condition 4 was distilled water and TE buffer pH 8.0.
The tubes were incubated in the same manner as Example 4 for another 24 hours.
The seeds were washed with distilled water three times. This method was adapted from Feldmann and Marks (Mol. Gen. Genet (1987) 208: 1-9).
Plate Preparation
MS30 plates were prepared using 4.4 g/L MS, 30 g/L sucrose and 8 g/L agar. The pH was adjusted to 5.8 using 1M KOH.
The solution was autoclaved, poured into 90 mm petri dishes and allowed to set. These were stored at 4° C. until use.

Seed Planting

Seeds (Arabidopsis and wheat) were pipetted onto plates in rows of 5-10 with 1 cm between each seed in all directions. The plates were sealed with parafilm (VWR International ltd, UK) and incubated in a Micro Clima-series economic lux chamber (Snijders Labs, Tilburg, Netherlands) with day cycles of 25° C. for 16 hours and night cycles at 22° C. for 8 hours. The plates were placed upright to allow stem and root extraction from the surface of the agar.

Hydroponics/Soil

Germinated seeds were planted as described in Example 4 above. Care was taken to avoid any cross contamination from water run off by adding water only to the tray.

Example 6

Foliar Spray Transformation

CND-L-PEG1000-NH$_2$/DNA nanoplexes prepared as in Example 3, DNA, TE buffer pH 8.0 complex, and control conditions were added to separate 100 mL spray bottles. 25 mL dH2O was added to each and they were inverted 3 times to mix.

Plants (Arabidopsis and wheat) were separated into separate trays, to prevent contamination, before spraying. The plants were kept separate during spraying and each plant was sprayed 3-4 times to coat the leaves. These were covered with lids to prevent contamination through evaporation and returned to their previous growth conditions.

The experimental condition was split, with half of the plants receiving the complex via spray once, while the other half was sprayed once weekly.

Plants were left to grow to maturity before leaves were taken for analysis.

Example 7

Multiple Spray for Germline Expression

*Arabidopsis* Columbia wildtype seeds were grown in soil in conditions. Soil was made at ¾ F2 compost (Levington F2 Seed and Modular Compost, Suffolk, UK) and ¼ horticultural sand (Melcourt Horticultural Silver Sand, Gloucestershire, UK). These were mixed, sieved to remove debris, and autoclaved or frozen for 24 hours to sterilise.

The soil was transferred to pots in a tray containing water. The soil was left to absorb water for 5 minutes and sterilised seeds were pipetted onto the surface. The plants were grown in the University of Bristol's GroDome under 22° C., 16-hour day lengths for 2 weeks. Seedlings were then divided into 4 groups and sprayed twice a day, at 9 am and 3 pm, for 4 consecutive days.

Group 1 was sprayed with 85 µl TE buffer+20 ml dH2O.

Group 2 was sprayed with 85 µl CND-L-PEG1000-NH$_2$/DNA nanoplex+85 µl TE buffer+20 ml dH2O.

Group 3 was sprayed with 85 µl DNA (pSIM24-eGFP)+85 µl TE buffer+20 ml dH2O.

Group 4 was sprayed with 85 µl CND-NH$_{2+85}$ µl DNA (pSIM24-eGFP)+85 µl TE buffer+20 ml dH2O.

All plants were sprayed from 10cm away until dripping.

The first true leaves were harvested an hour before the first spray and then each day an hour after the last spray. These were snap frozen in liquid nitrogen and stored at −80° C. This was replicated 3 times.

Plants were allowed to grow and seeds were harvested, sterilised, and plated on ½ MS, 8% agar plates and on ½ MS+50 mg/L kanamycin, 80% agar plates to test if the germline had been transformed.

Example 8

Dipping Arabidopsis for Germline Expression

*Arabidopsis* Columbia wild type seeds were grown as set out in Example 7. Seedlings were then divided into 4 groups and dipped once or 3 times over 3 consecutive days in solutions as set out in Example 7 (the solutions used for spraying in Example 7).

Solutions for each group were placed into plastic bags and the whole plant above soil level was placed inside and coated in the solution. The plants were then returned to growth conditions and allowed to grow until fruiting. Seeds were then harvested and dried.

Seeds of the plants from groups 1-4 were sterilised and plated on ½ MS, 8% agar plates and on ½ MS+50 mg/L kanamycin, 80% agar plates to test if the germline had been transformed.

Example 9

Hydroponics Transformation

Wheat seeds were prepared as follows. 400 mL ½ MSO agar was prepared as instructed by the manufacturer (Sigma Aldrich, Dorset, UK) by mixing 0.88 g Mirashige and Skoog (MS), 3.2 g Agar and 400 mL dH2O. This was autoclaved to sterilise and pipetted into hydroponics seed holders. These were allowed to set and seeds were pipetted onto the agar, one per holder.

Plants were grown in hydroponics. *Triticum aestivum* cv. USU-Apogee were grown in high density compartments to allow full development. The water of the hydroponics was supplemented with autoclaved Hoagland's solution (0.5 g/L) pH 5.8 and was refilled with standard water twice a week. Further Hoagland's solution of the same concentration was added as required, based on plant condition.

Five separate hydroponics boxes were used to prevent contamination. They were grown under the conditions described in example 7 until flowers were emerging.

CND-L-PEG1000-NH$_2$/DNA nanoplex and TE buffer pH 8.0 was added to two of the boxes. One box had the CND-L-PEG1000-NH$_2$/DNA nanoplex added once, and the other had the nanoplex added once a week. The other three boxes were used as controls, one with DNA and TE buffer pH 8.0, one with CND-L-PEG1000-NH$_2$ and TE buffer pH 8.0, and one was left to grow as a wild type control.

Example 10

Protoplast Transformation

Plant Growth Conditions

Wheat seeds were planted as follows. Soil was made at ¾ F2 compost (Levington F2 Seed and Modular Compost, Suffolk, UK) and ¼ horticultural sand (Melcourt Horticultural Silver Sand, Gloucestershire, UK). These were mixed, sieved to remove debris, and autoclaved (time, temperature, pressure) or frozen (temperature) for 24 hours to sterilise.

The soil was transferred to pots in a tray containing water. The soil was left to absorb water for 5 minutes and sterilised seeds were pipetted onto the surface. The plants were grown in the University of Bristol's GroDome under 20° C. These were then grown in continuous darkness at 25° C. for 3-5 weeks, until leaves were well developed.

Protoplast Extraction and Transformation

Between 8 and 10 leaves were cut from the plants using scissors and placed in a 1 L beaker of $dH_2O$. They were swirled to wash and left to soak for 5 minutes.

5 mL of plasmolysis buffer was added to a sterile 9 mm petri dish lid and the leaves were cut in 0.5-1.0 mm strips using a sterile razor blade. The cut leaves were transferred to a beaker containing 50 mL enzyme solution and vacuumed for 10 minutes. The enzyme solution/leaf mix was incubated at 23° C. for 24 hours.

A nylon mesh was coated with plasmolysis buffer and the enzyme solution was carefully poured through into a 50 mL Falcon tube. The tube was kept at a 45° angle to prevent damage to cells from falling. The plasmolysis buffer was added to the plant tissue in the beaker in 5 mL, swirled and poured through the nylon mesh twice more.

The leaf/plasmolysis buffer mix was centrifuged for 4 minutes at 1200 RPM and the resulting pellet was resuspended in 3 mL W5 solution on ice for 30 minutes. During this time an aliquot was taken and protoplast density was estimated using a haemocytometer. The solution was centrifuged in the same manner again and the supernatant was removed. The pellet was resuspended in MaMg solution at $1\times10^6$ cells per mL.

The protoplast solution was aliquoted into 2 mL Eppendorf tubes and a CND-L-PEG1000-$NH_2$/DNA/TE buffer pH 8.0 complex, prepared as described in Example 3, was added to one, with the other acting as a control. This was incubated for 1 hour at room temperature in the dark before 1 mL incubation medium was added to each tube. These were incubated for 12-16 hours at 28° C. in the dark.

The cells were imaged on a fluorescence microscope immediately after the incubation period to prevent protoplast deterioration.

Example 11

Vacuum Infiltration

Wheat plants were grown in soil for 2 weeks. Soil was made at ¾ F2 compost (Levington F2 Seed and Modular Compost, Suffolk, UK) and ¼ horticultural sand (Melcourt Horticultural Silver Sand, Gloucestershire, UK). These were mixed, sieved to remove debris, and autoclaved (time, temperature, pressure) or frozen (temperature) for 24 hours to sterilise.

The soil was transferred to pots in a tray containing water. The soil was left to absorb water for 5 minutes and sterilised seeds were pipetted onto the surface. The plants were grown in the University of Bristol's GroDome under 20° C., 16 hour day lengths. The plants were removed from pots and the roots were washed in $dH_2O$ until minimal soil remained. Plants were allocated as 2 plants per control condition and 6 plants per experimental condition. The control conditions were wildtype, DNA only and CND-PEG1000-$NH_2$ only, while the experimental condition was CND-L-PEG1000-$NH_2$+Cas9. The solutions were made in Eppendrof tubes, vortexed for 20 seconds, and transferred to 50 ml Falcon tubes with 20 ml dH2O+SDW (0.02%).

The solutions were added to square petri dishes and plants were placed into the solution, with the leaves submerged. The roots were kept outside the petri dishes to prevent and remaining soil from mixing with the solution.

The plants in the petri dishes were placed one condition at a time in the vacuum jar and the vacuum was turned on for 60 seconds. The vacuum was turned off and the plants were left under vacuum conditions for 2 minutes. The vacuum was slowly released and the plants were rinsed in $dH_2O$ and repotted.

The plants were left to recover for 9 days before imaging using a confocal laser scanning microscope.

Example 12

CND Discs

CND Disc Manufacture

Discs of CNDs were made as follows: 100 mg poly(lactic-co-glycolic acid) (PLGA) was dissolved in 2 mL of Dichloromethane (DCM). 500 μL of CND-L-PEG1000-$NH_2$/DNA (10 mg/mL) were added. When a homogeneous mixture was obtained the solution was poured into a disk-shaped container and dried for 16 h at room temperature and 12 h at room temperature under vacuum.

CND Discs for Transformation

Two conditions were used for the experiment. Condition 1 had a CND-L-PEG1000-$NH_2$/DNA nanoplex disc placed in the bottom of the pot and the pot was filled halfway with soil, seeds were then placed on top and soil was added to fill the pot. Condition 2 had soil added to fill the pot halfway and seeds were placed on top with a CND-L-PEG1000-$NH_2$/DNA nanoplex disc, and soil was used to fill the pot.

Plants were left to grow under standard conditions for the given species for two weeks before they were imaged using the confocal laser scanning microscope.

Example 13

Glycan Funcationalised CNDs (CND-TTDDA-Glycan Nanodots)

The carbon nanodot cores (CND-$NH_2$) were produced as in Example 1 step 1→2 in the scheme below.

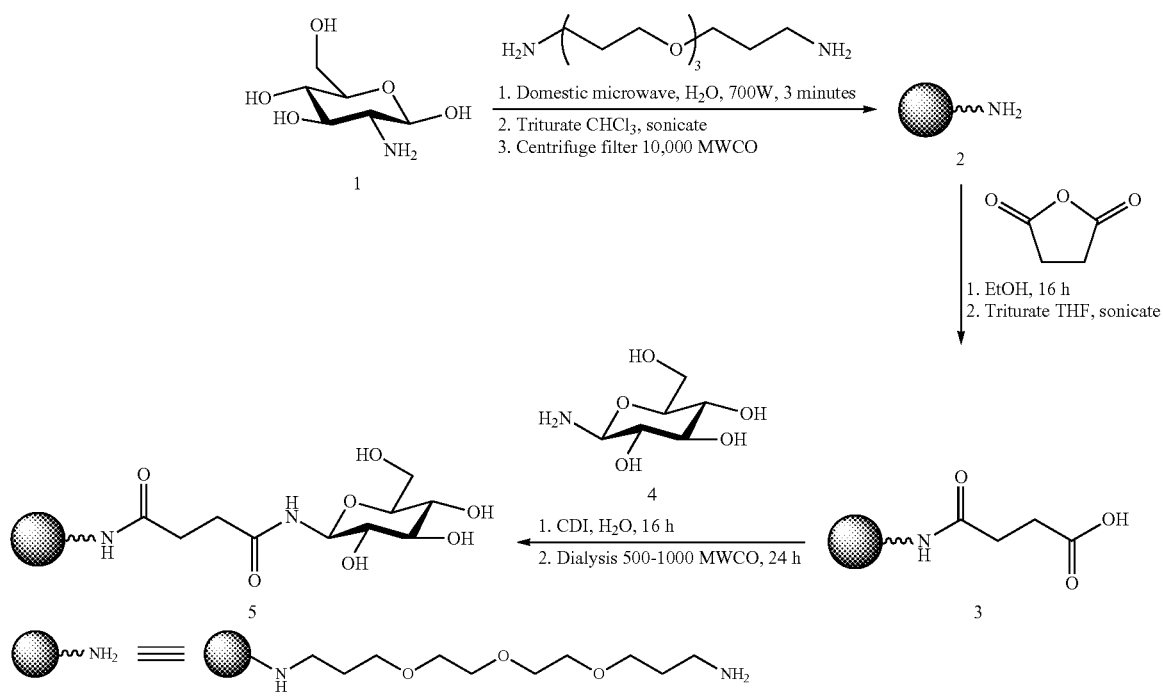

Glycan Functionalisation (2→5 in Scheme)

The carbon nanodots (CND-L-NH$_2$) were dissolved in methanol to a concentration of 10 mg/ml and sonicated. This solution was then passed through a 200 nm syringe filter and mixed with 0.5 equivalents by weight of succinic anhydride. The solution was subsequently stirred vigorously overnight. The resulting solution was then reduced and the brown oil washed and sonicated with tetrahydrofuran several times, discarding the supernatant, until the supernatant was clear. The resulting brown oil was then dissolved in methanol, reduced in vacuo and weighed. The brown oil was then dissolved in distilled H$_2$O to a concentration of 10 mg/ml and sonicated for 5 minutes. This solution was then passed through a 200 nm syringe filter and to the resulting mixture 2 equivalents by weight of carbonyldiimidazole (CDI) and either 10 equivalents by weight of aminated monosaccharide (4) or 20 equivalents by weight of aminated disaccharide were added and left stirred for 17 h in the dark. The resulting mixture was dialysed overnight against distilled H$_2$O at 0.5-01 kDa MWCO with Biotech Cellulose Ester membranes, replacing the distilled H$_2$O after the first couple of hours.

The resulting brown oil containing the CND-TTDDA-glycan nanodot product (5) was then again freeze-dried.

For storage the CND-TTDDA-glycan nanodots were dissolved in either HPLC grade methanol and kept at 4° C. to prevent aggregation.

The CND-TTDDA-glycan nanodot product was characterized by NMR. The $^1$H and HSQC 500MHz NMR spectra were obtained. All samples were dissolved at 5 mg/ml in 0.8ml D$_2$O using use Norrell Select Series 7" tubes (S-5-500-7). All spectra were taken on a Bruker Advance III HD 500 Cryo. All shifts are quoted in ppm. Residual internal D$_2$O is at δ=4.70. Peaks were identified using both H-1 and HSQC NMR.

NMR spectra of the core CNDs, (2) in the scheme above, agrees with previous work (Hill et al. (Nanoscale, 2016, 8, 18630)). The whole of the TTDDA linker is identified and assigned. Extra peaks to the TTDDA are also observed at the following ranges: H-1 δ=7-9 and C-13 δ=115-150. These peaks are produced by hydrogens on aromatics and phenols on the surface of the CND cores. C=C bending and stretching, Aryl C—O stretching and a weak phenol O—H bending signal can also be observed in the FTIR to support this conclusion.

The NMR spectra for the CND-TTDDA-glycan nanodot product were obtained. For each of these spectra the TTDDA linker is identified, although often not completely assigned due to overlap with peaks produced by hydrogens attached to carbons 2-6 of the carbohydrates. These peaks are themselves also difficult to assign individually due to their overlap with each other however are characteristically observed in the following ranges: H-1 δ=3.0-3.8 and C-13 δ=55-80. Due to these overlaps the success of carbohydrate functionalisation was instead determined by the identification of the characteristic doublet peak associated with the hydrogen on the anomeric carbon of complete carbohydrates. This doublet is found in the following ranges: H-1 δ=4.2-5.5 and C-13 δ=90-105. Often more than one doublet is observed, this can arise from reduced freedom of the carbohydrate due to being tethered to a nanoparticle. This was observed for all of the glycan-functionalized CNDs. This agrees with previous work showing the NMR spectra for lactose-CNDs and work on the glycan-functionalisation of CdSe quantum dots (Angew. Chem. Int. Ed. 2014, 53, 810-814).

Example 14

Effect of Sugar Functionalized CNDs on Algal Photosynthesis

Tests were carried out to determine the effect on photosynthesis in *Chlamydomonas reinhardtii* of treatment with glucose-functionalized CNDs (CND-TTDDA-glucose) formed as set out in Example 13.

The *Chlamydomonas reinhardtii* was sourced from CCAP (Culture Collection of Algae and Protozoa), Scottish Marine Institute, Oban, Argyll. PA37 1QA, UK—Strain number: CCAP 11/45.

The algal sample was sub-cultured—5 ml into 4×20 ml "3NBBM+V" solution (see below for composition). The algae were sub-cultured fortnightly by taking 5 ml algae and adding to 15 ml fresh media in 25 cm$^2$ cell culture flasks with vented lids (Corning).

Growing conditions: 16 hours day at 25° C. (MICRO CLIMA-SERIES™ ECONOMIC LUX CHAMBER approximately 4,700 lux), 8 hours night at 22° C.

800 ml of fresh media in a 1l Corning flask was spiked with algae to a cell count of 1000 cells/ml. The flasks were spiked with the CND-TTDDA-glucose nanodots at 50 mg/l. These flasks were continuously bubbled with air through the experiment. The cultures were destructively sampled for flow cytometry by taking 2 ml aliquots.

Media
3NBBM+V (Bold Basal Medium with 3 Fold Nitrogen and Vitamins; Modified)

| Stock solutions in g/1000 ml water | for 1 litre final medium |
|---|---|
| (1) 25.0 g NaNO$_3$ | 30.0 ml |
| (2) 2.5 g CaCl$_2$•2H$_2$O | 10.0 ml |
| (3) 7.5 g MgSO$_4$•7H$_2$O | 10.0 ml |
| (4) 7.5 g K$_2$HPO$_4$•3H$_2$O | 10.0 ml |
| (5) 17.5 g KH$_2$PO$_4$ | 10.0 ml |
| (6) 2.5 g NaCl | 10.0 ml |
| (7) trace element solution (see below) | 6.0 ml |
| (8) vitamin B1 (see below) | 1.0 ml |
| (9) vitamin B12 (see below) | 1.0 ml |
| Make up to 1 liter with distilled water. For agar add 15 g per liter Bacterial Agar. Autoclave at 15 psi for 15 minutes. | |

Trace Element Solution (7)
Add to 1000 ml of distilled water 0.75 g Na$_2$EDTA and the minerals in the following sequence:

| | |
|---|---|
| FeCl$_3$•6H$_2$O | 97.0 mg |
| MnCl$_2$•4H$_2$O | 41.0 mg |
| ZnCl$_2$ | 5.0 mg |
| CoCl$_2$•6H$_2$O | 2.0 mg |
| Na$_2$MoO$_4$•2H$_2$O | 4.0 mg |
| Vitamin B1 (8) | |
| 0.12 g Thiamin hydrochloride in 100 ml distilled water. Filter sterile. | |
| Vitamin B12 (9) | |
| 0.1 g Cyanocobalamin in 100 ml distilled water, take 1 ml of this solution and add 99 ml distilled water. Filter sterile. | |

Example 15

Treatment of Tobacco Plants with CNDs

*Nicotia Tabacum* grown for 8 weeks post germination. The tobacco was planted in separate pots in Levington Advance F2. They were watered with Hoagland's solution (Sigma) 3 times a week from 2 weeks post germination until sampling.

For the treatments, the feed was spiked at 50 mg/l of either CND-NH$_2$ cores (formed as set out in Example 1) or glucose-functionalized CNDs (CND-TTDDA-glucose) (formed as set out in Example 13).

Fluorescence spectroscopy of leaf vein and mesophyll samples shows good uptake of both CND-NH$_2$ cores and glucose-functionalized CNDs (CND-TTDDA-glucose) in all samples.

Example 16

Uptake of Glucose-Functionalized CNDs by Tobacco and Wheat Plants

Tobacco (*Nicotina tabacum*) and wheat (*Triticum aestivum* 'Apogee') plants were grown in Levington F2 compost and watered three times a week. Two weeks after germination, the plants were watered with a 50 mg/l solution of CNDs functionalised with glucose. No further additives or nutrients were present in the solution. While CND-TTDDA-glucose concentrations of around 50 mg/l achieve good cellular uptake and intracellular maintenance of the CNDs, concentrations of 100 mg/l and higher were observed to cause the plants to store the CNDs in the vacuoles, leading to CND sequestration.

Figure 4:
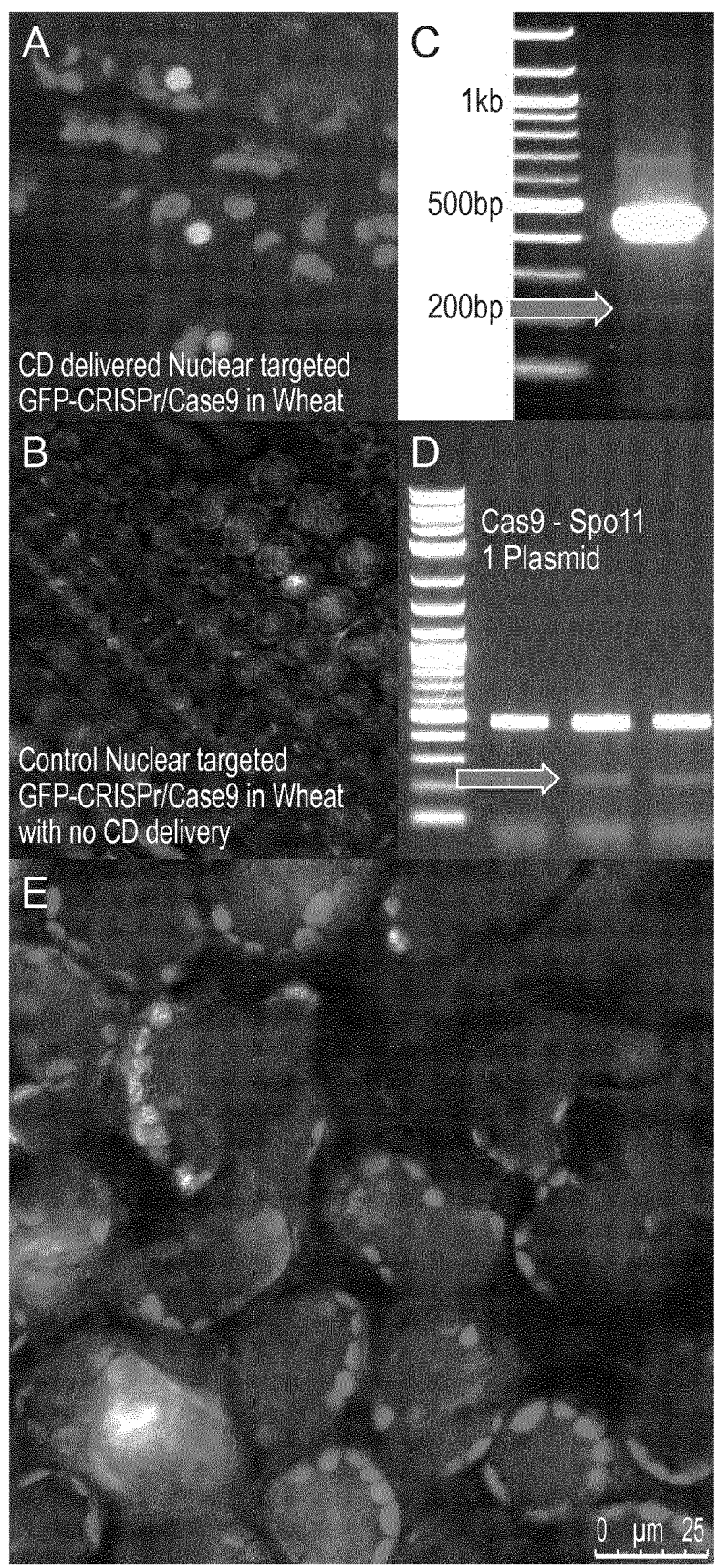
FIG. 4. Confocal microscopy images. A: Wheat: Following foliar spray with CND carrying Cas9-GFP expression plasmids: CND are visible as spheroids in the red channel inside the cells, appearing to be located near the surface; GFP areas are visible in the green channel as spheroids near the centre of the cells, consistent with a nuclear location of the Cas9-GFP fusion product. B: Wheat following foliar spray with Cas9-GFP expression plasmids but without CND (no-CND controls). Autofluorescence of chlorophyll in the chloroplasts is visible as faint outlines in the red channel). C and D: Agarose gels show CRISPr, Cas9 and eGFP insert. E: Arabidopsis seeds following dip in a solution of CND compounds carrying YFP expression plasmids: CND are visible as small spheroids in the red channel inside the seeds, appearing to be located near the surface; yellow fluorescent protein expression (YFP) is visible in some seeds in the yellow channel, also inside the seeds and near the surface but appearing less well-defined than the red spheroid CNDs.
Figure 15:
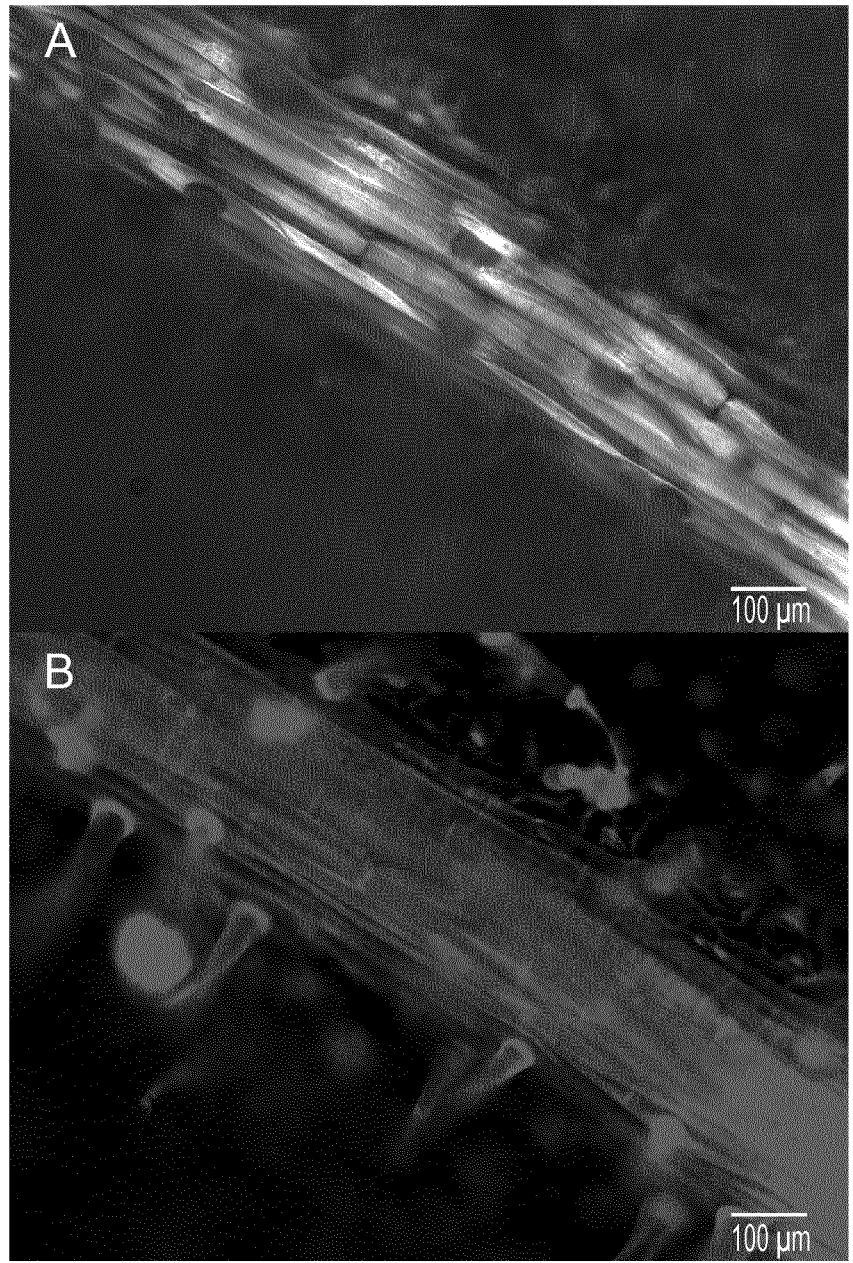
FIG. 15. *Nicotia Tabacum* grown for 8 weeks post germination. The tobacco was planted in separate pots in Levington Advance F2. They were watered with Hoagland's solution (Sigma) 3 times a week from 2 weeks post germination until sampling. For the treatments, the feed was spiked at 50 mg/l of CDs. Glucose-CD treated leaf vein (A) bright field; (B) Carbon dot fluorescence (365 nm excitation, 450 nm emission).
Figure 16:
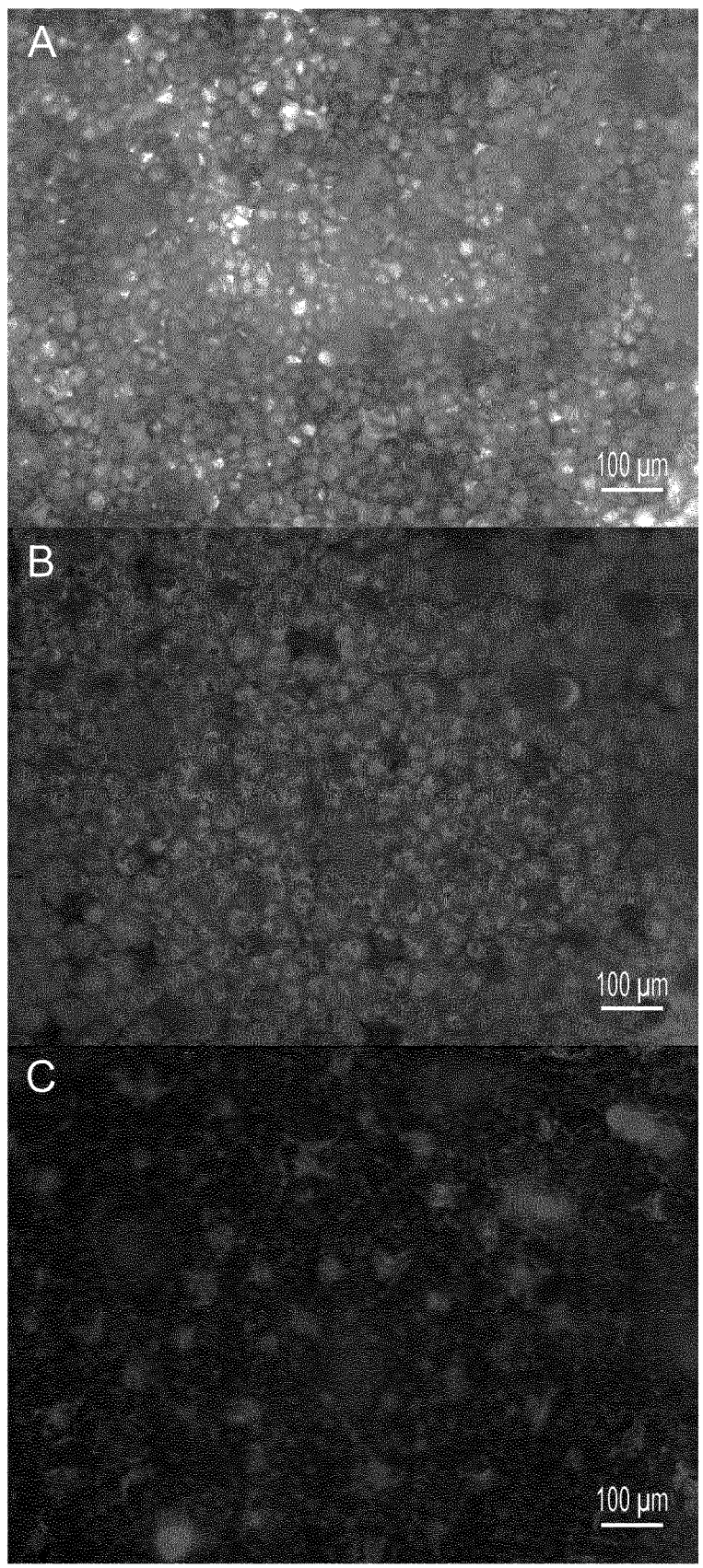
FIG. 16. *Nicotia Tabacum* grown for 8 weeks post germination. The tobacco was planted in separate pots in Levington Advance F2. They were watered with Hoagland's solution (Sigma) 3 times a week from 2 weeks post germination until sampling. For the treatments, the feed was spiked at 50 mg/l of CDs. Glucose-CD treated mesophyll (A) bright field; (B) Chlorophyll fluorescence; (C) Carbon dot fluorescence (365 nm excitation, 450 nm emission).
Figure 17:
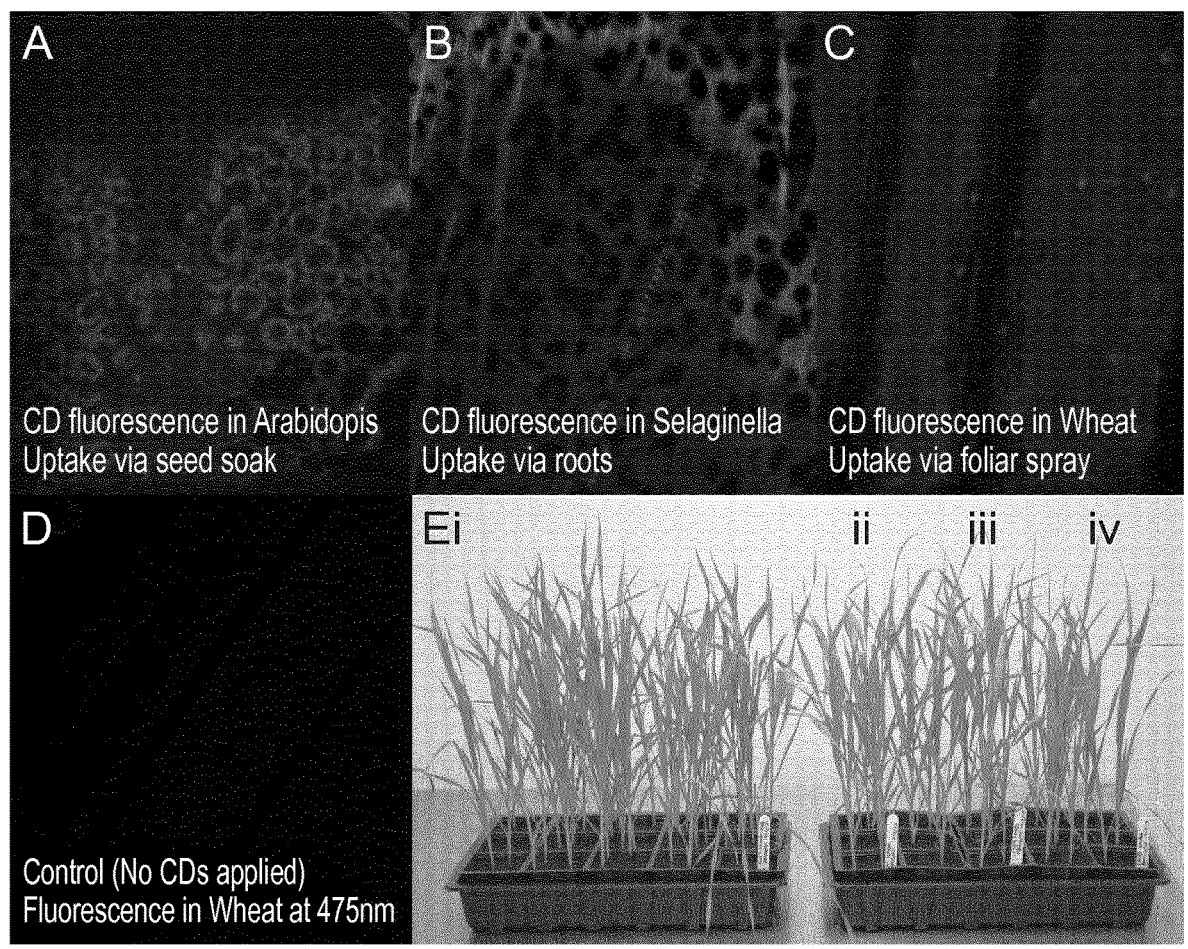
FIG. 17. Arabidopsis (A), Selaginnella (B), and Wheat (C), (D) and (E). Panel (A) shows CNDs as fluorescence in the 475 nm channel in Arabidopsis seeds following seed soak. Panel (B) shows CNDs as fluorescence in the 475 nm channel in Selaginnella following uptake via roots. Panel (C) shows CNDs as fluorescence in the 475 nm channel in wheat following foliage spray. Panel (D) shows an absence of CNDs as (no fluorescence in the 475 nm channel) in wheat that have not been sprayed with CND. Panel (E) shows Wheat treated with CND+Cas9 (i); Wheat WT (ii), Cas9 control (iii), and CND control (iv).
Figure 18:
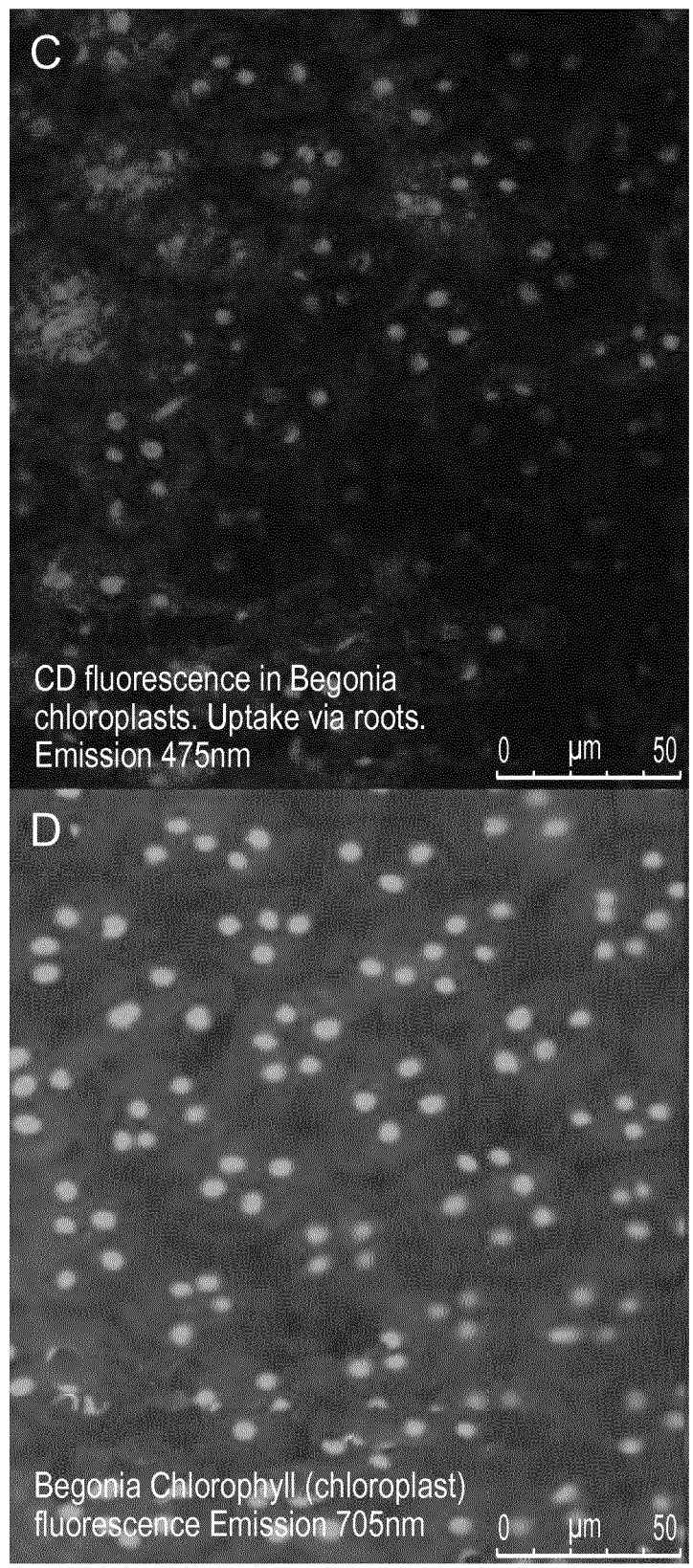
FIG. 18. Organelle targeting in Begonia. Maltose functionalized CNDs, visible in the 475 nm channel panel (C), appear to accumulate in chloroplasts, which are visible in the 705 nm channel in panel (D).

Both wheat and tobacco showed uptake for the core carbon dots (CND-NH$_2$) (see FIG. 4, lower panel (A) for wheat; and FIGS. 15 and 16 for tobacco). Cellular internalisation was observed for both the glucose and maltose functionalised CDs. Mannose, galactose and lactose functionalised CDs were not observed to be taken up by either wheat or tobacco.

Example 17

Effect of Treatment with CND Cores and Glucose-Functionalized CNDs on Photosynthesis The response of net photosynthesis (A) to actinic light was measured using a portable gas exchange system (Waltz, GFS-3000). Leaves were illuminated with a photosynthetic photon flux density (PPFD) of up to 1603 μmol.m$^{-2}$.s$^{-1}$ with an integral red-blue LED light source (Waltz, 3040-L). The following conditions were maintained: Leaf temperature of 22° C., vapour pressure deficit (VPD) of 1±0.2 kPa, H$_2$O concentration of 17000 ppm, atmospheric O$_2$ and a CO$_2$ concentration of 400 ppm. Leaves were dark adapted for 40 minutes prior to measurement.

Figure 7:
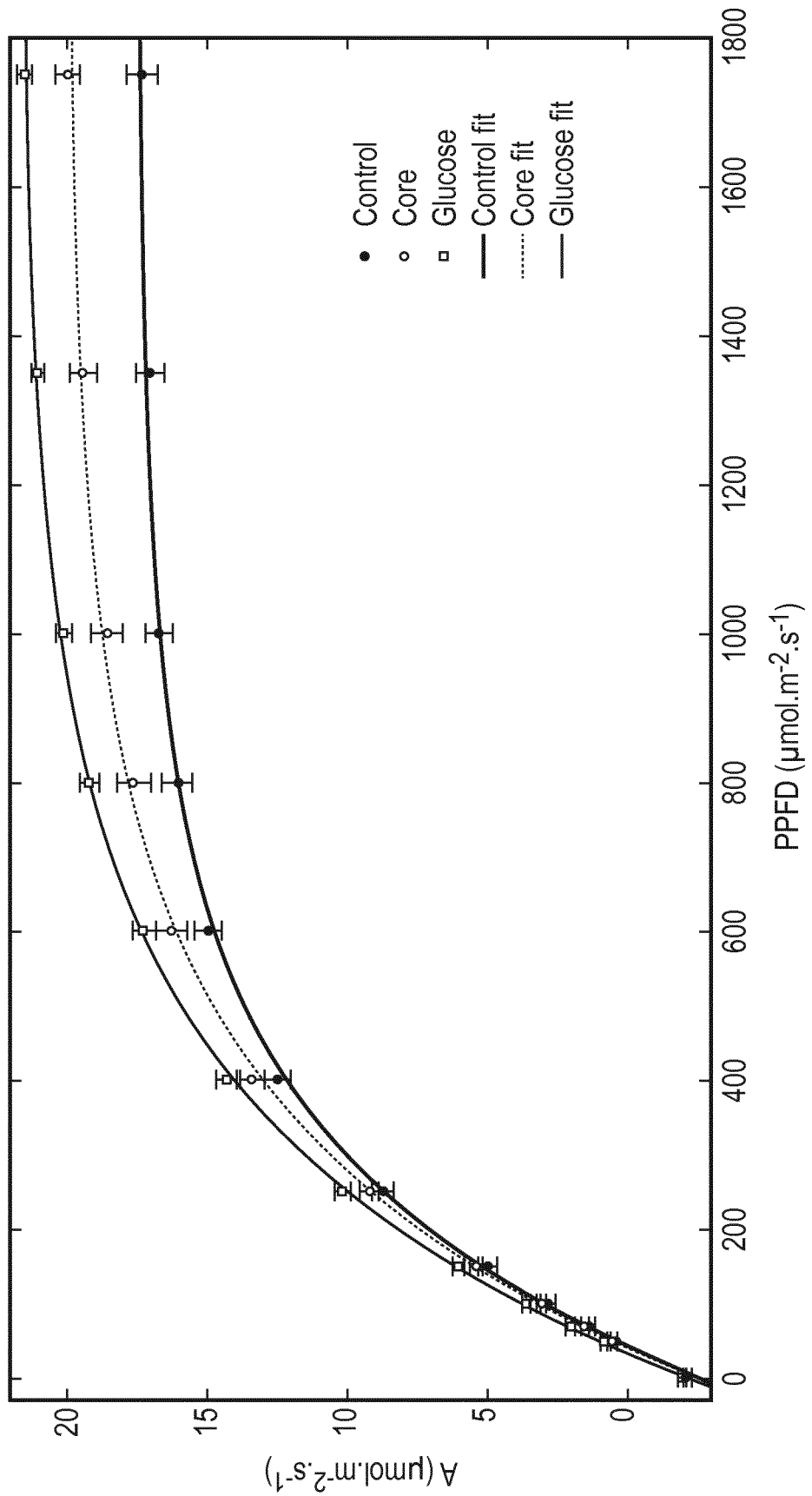
FIG. 7. Carbon assimilation light curve. The core CND treatment (middle plot) is significantly greater than control (lower plot) for a PPFD of 600 $\mu mol.m^{-2}.s^{-1}$ while the CND-glucose treatment plant (upper plot) is significantly greater than control at all light intensities (p<0.05). Control: n=19, Amax=17.43±0.34 μmol.m-2.s-1, $(R^2)^-$=0.9989. Core: n=24, Amax=19.90±0.36 μmol.m-2.s-1, $(R^2)^-$=0.9992. Glucose: n=22, Amax=21.52±0.27 μmol.m-2.s-1 $(R^2)^-$=0.9997. Errors in Amax are the 95% confidence bounds. Ambient CO2 and H2O levels were used.
Figure 8:
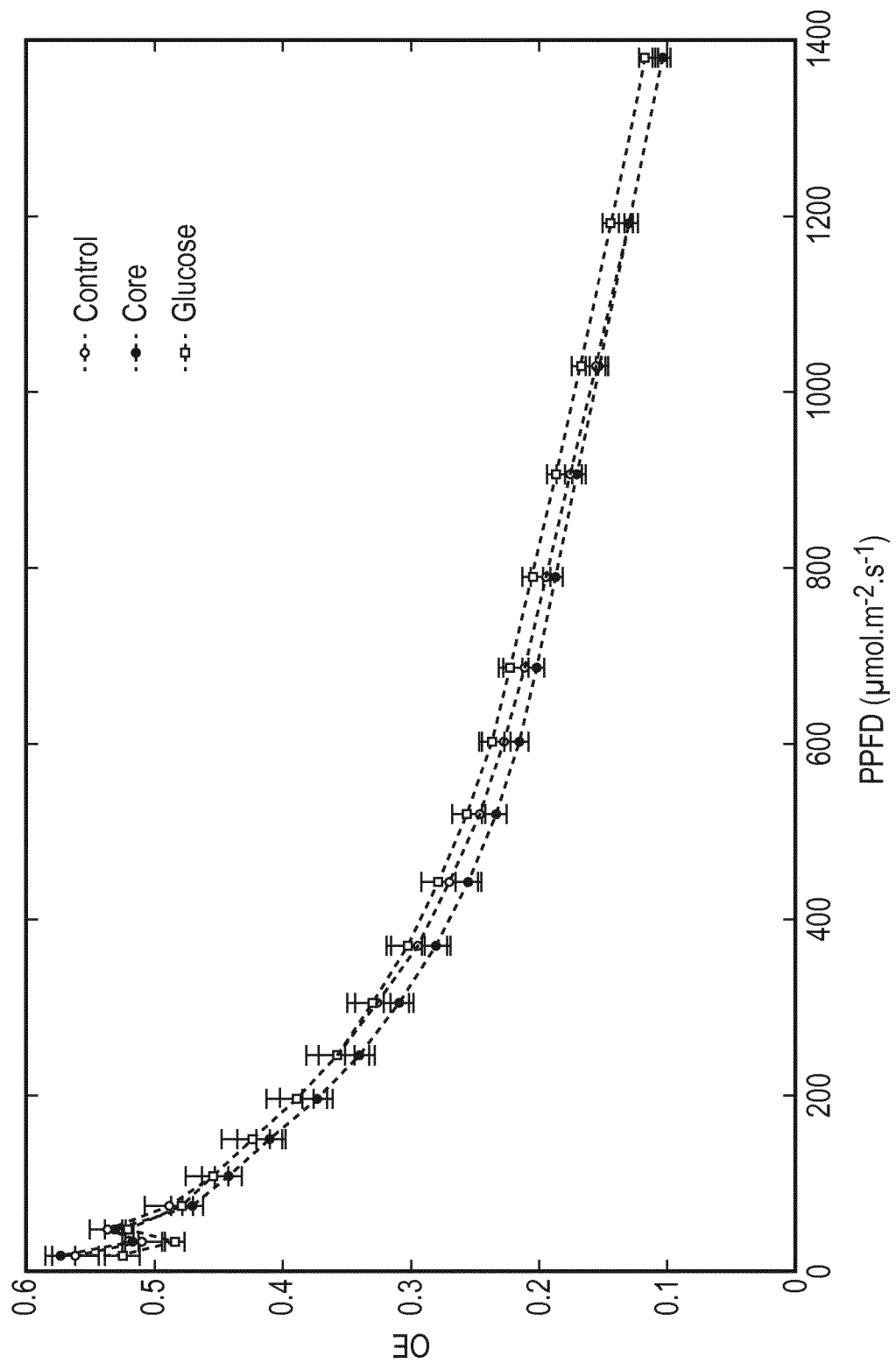
FIG. 8. Chlorophyll fluorescence (PAM)—Operating efficiency (Fq'/Fm') light curve. For PPFD values of 200 $\mu mol.m^{-2}.s^{-1}$ and above, the OE (operating efficiency) for the CND-glucose group is highest (upper plot), while the control group (middle plot) is greater than the CND group (lower plot).
Figure 9:
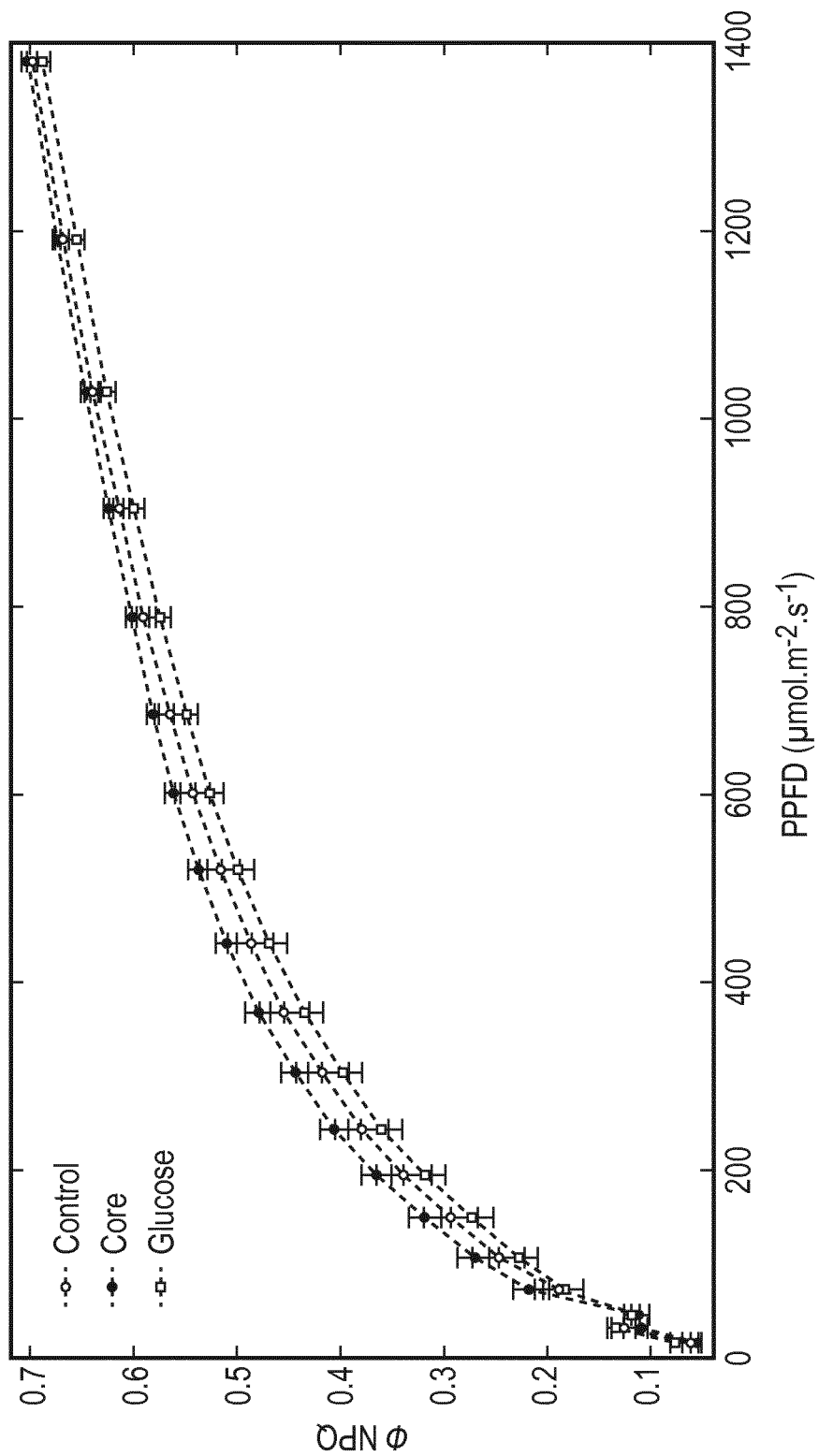
FIG. 9. Chlorophyll fluorescence (PAM)—Non-photochemical quenching (NPQ) light curve. The NPQ values at a given PPFD value are greatest for the CND treated group (upper plot), while the control group (middle plot) is greater than the CND-glucose group (lower plot).
Figure 10:
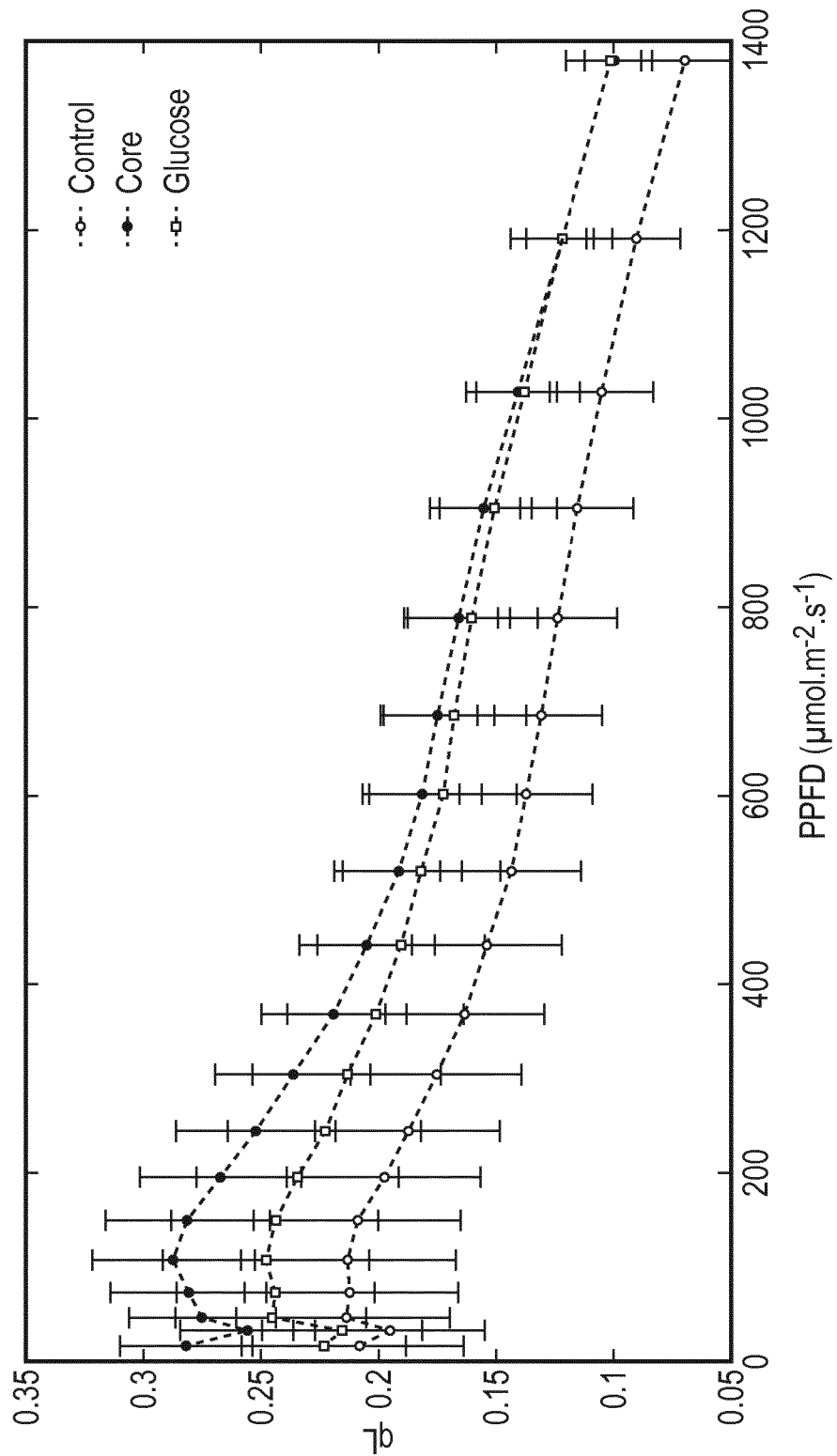
FIG. 10. Chlorophyll fluorescence (PAM)—qL light curve, which indicates the 'openness' of PSII. The qL values at a given PPFD value are generally greater for the CND treated group (upper plot), while the CND-glucose group (middle plot) is greater than the control group (lower plot).
Figure 11:
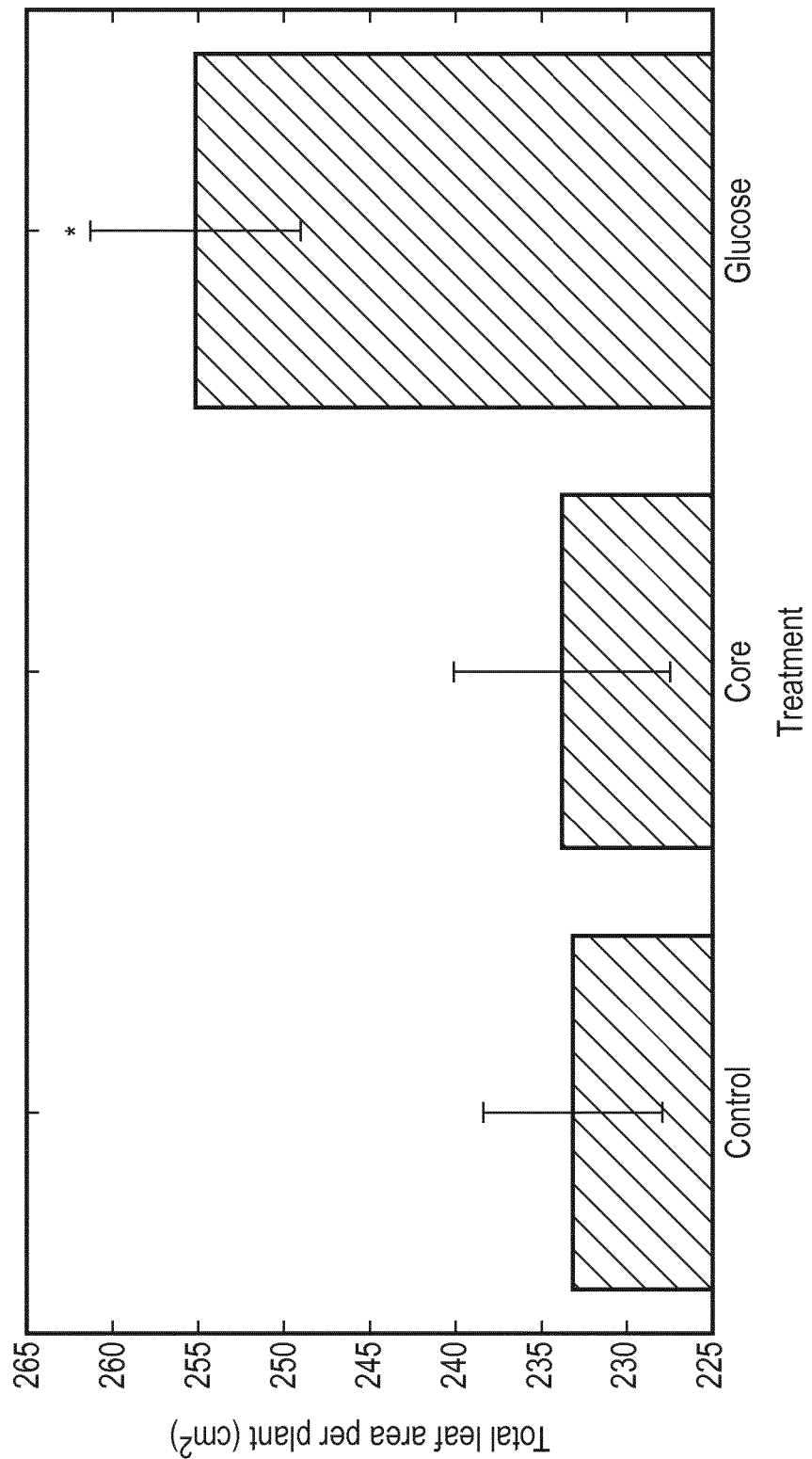
FIG. 11. Leaf area. Plants treated with CND-glucose have a significantly greater leaf area than the untreated control plants and the CND treated plants.

FIG. 7 shows a photosynthetic rate (A) order for photon flux densities (PPFD) above about 500 of control<core<glucose. FIG. 8 shows Chlorophyll fluorescence (PAM)—operating efficiency for the CND-glucose group is highest (upper plot), while the control group (middle plot) is greater than the CND group (lower plot). FIG. 9 shows (PAM)—Non-photochemical quenching (NPQ) light curve. The NPQ values at a given PPFD value are greatest for the CND treated group (upper plot), while the control group (middle plot) is greater than the CND-glucose group (lower plot). FIG. 10 shows (PAM)—qL light curve, which indicates the openness of PSII. The qL values at a given PPFD value are generally greater for the CND treated group (upper plot), while the CND-glucose group (middle plot) is greater than the control group (lower plot). FIG. 11 shows that the leaf area of plants treated with CND-glucose have a significantly greater leaf area than the untreated control plants and the CND treated plants.

Example 18

Figure 12:
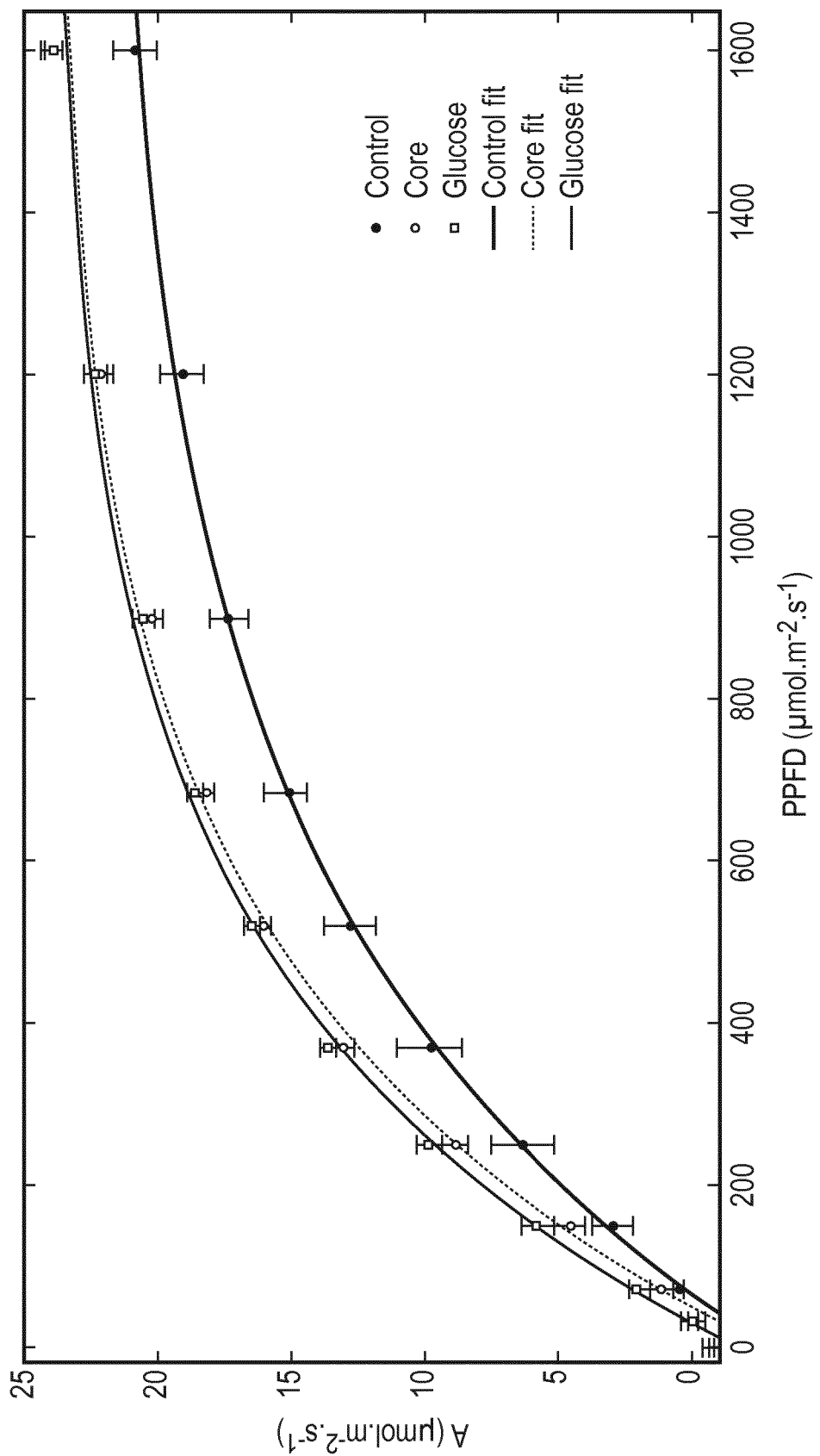
FIG. 12. Carbon assimilation in wheat. Plants treated with CND-glucose exhibit an increased rate of carbon assimilation (upper plot). The rate of carbon assimilation is also increased for CND treated plants (middle plot). The lower plot represents the control plants.
Figure 13:
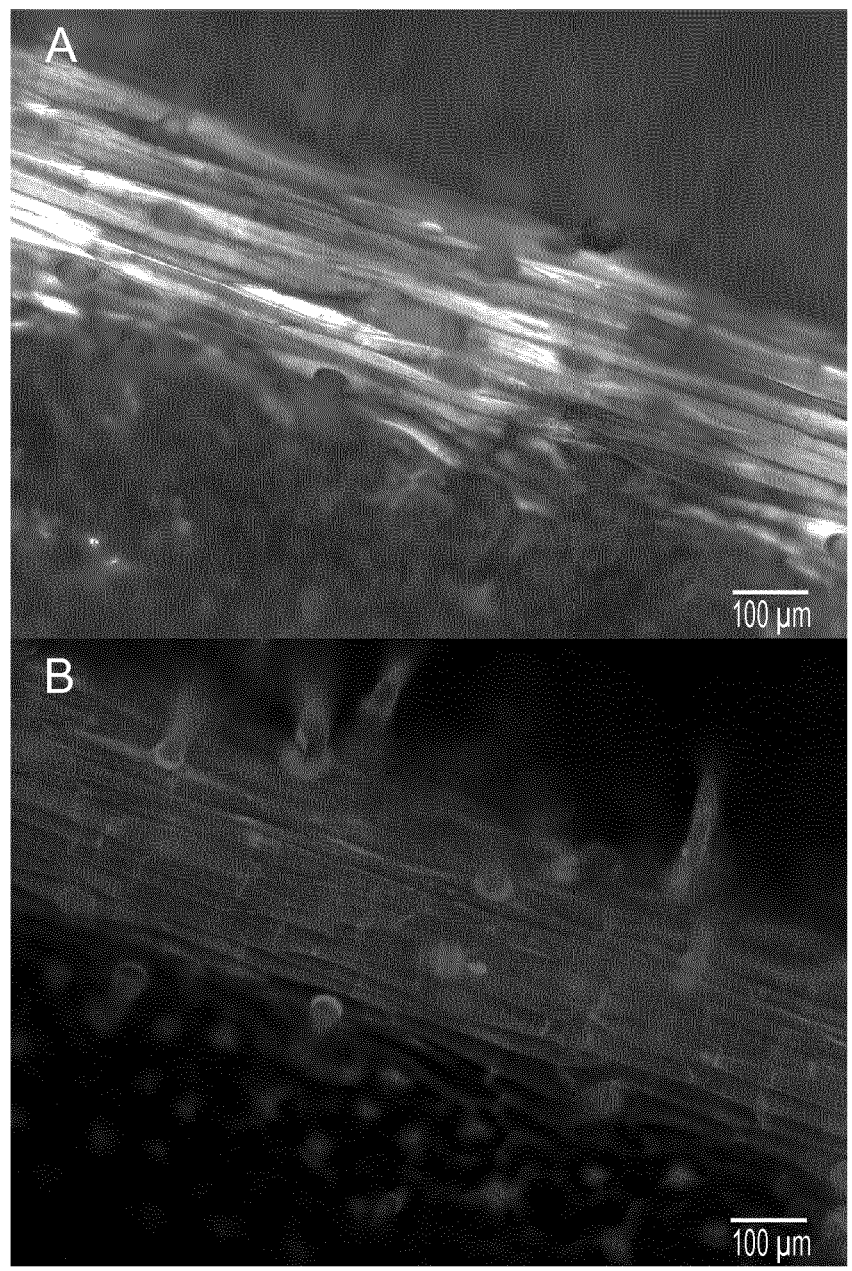
FIG. 13. *Nicotia Tabacum* grown for 8 weeks post germination. The tobacco was planted in separate pots in Levington Advance F2. They were watered with Hoagland's solution (Sigma) 3 times a week from 2 weeks post germination until sampling. For the treatments, the feed was spiked at 50 mg/l of CDs. Core-CD treated leaf vein (A) bright field; (B) Carbon dot fluorescence (365 nm excitation, 450 nm emission).
Figure 14:
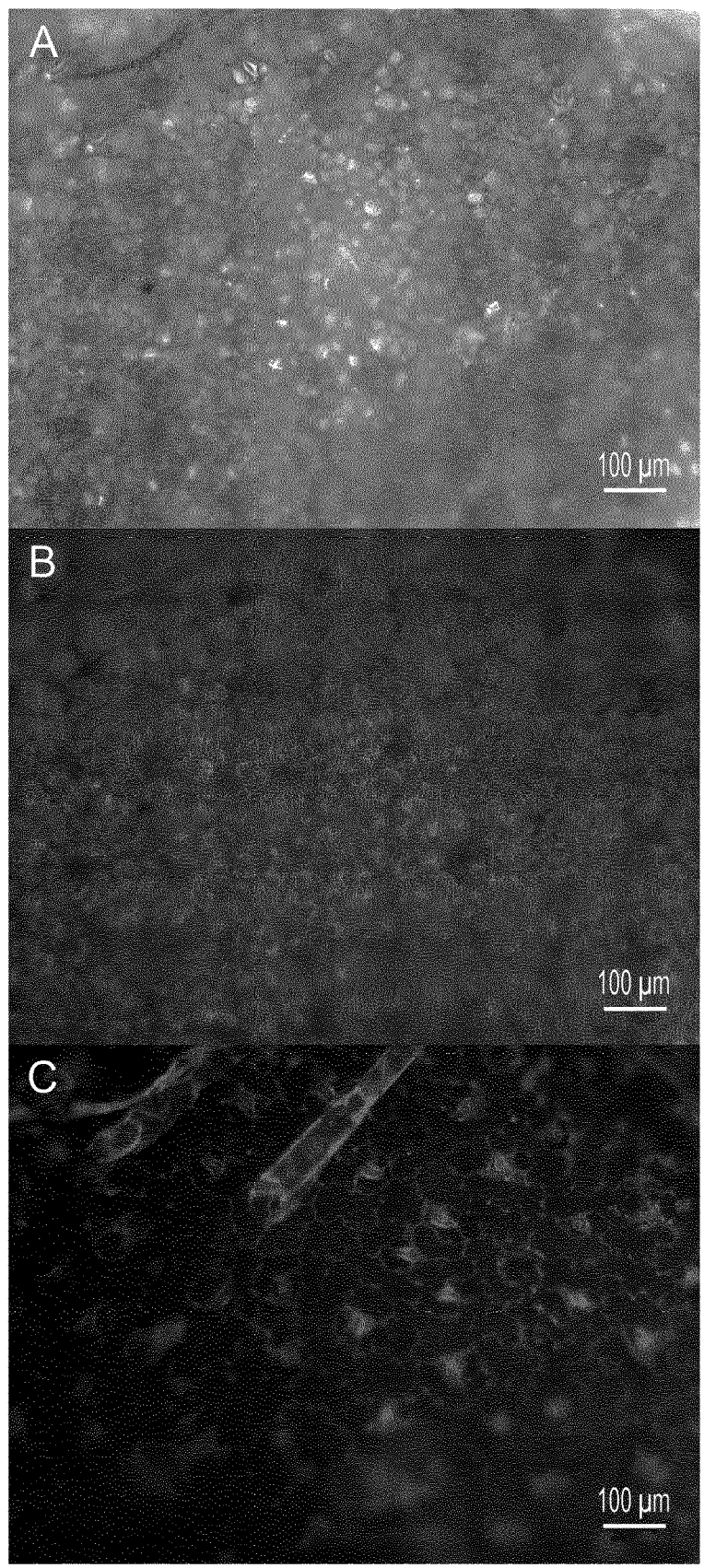
FIG. 14. *Nicotia Tabacum* grown for 8 weeks post germination. The tobacco was planted in separate pots in Levington Advance F2. They were watered with Hoagland's solution (Sigma) 3 times a week from 2 weeks post germination until sampling. For the treatments, the feed was spiked at 50 mg/l of CDs. Core-CD treated mesophyll (A) bright field; (B) Chlorophyll fluorescence; (C) Carbon dot fluorescence (365 nm excitation, 450 nm emission).

Effect of Treatment with CND Cores and Glucose-Functionalized CNDs on Carbon Assimilation Wheat plants were grown and watered with a solution of CND cores (CND-NH$_2$) or CNDs functionalised with glucose (CND-TTDDA-glucose), as described in Example 17. Plants treated with CNDs functionalised with glucose CND cores exhibit an increased rate of carbon assimilation compared to control plants, with glucose functionalised CNDs producing the largest increase in carbon assimilation rates (see FIG. 12).

Example 19

Figure 19:
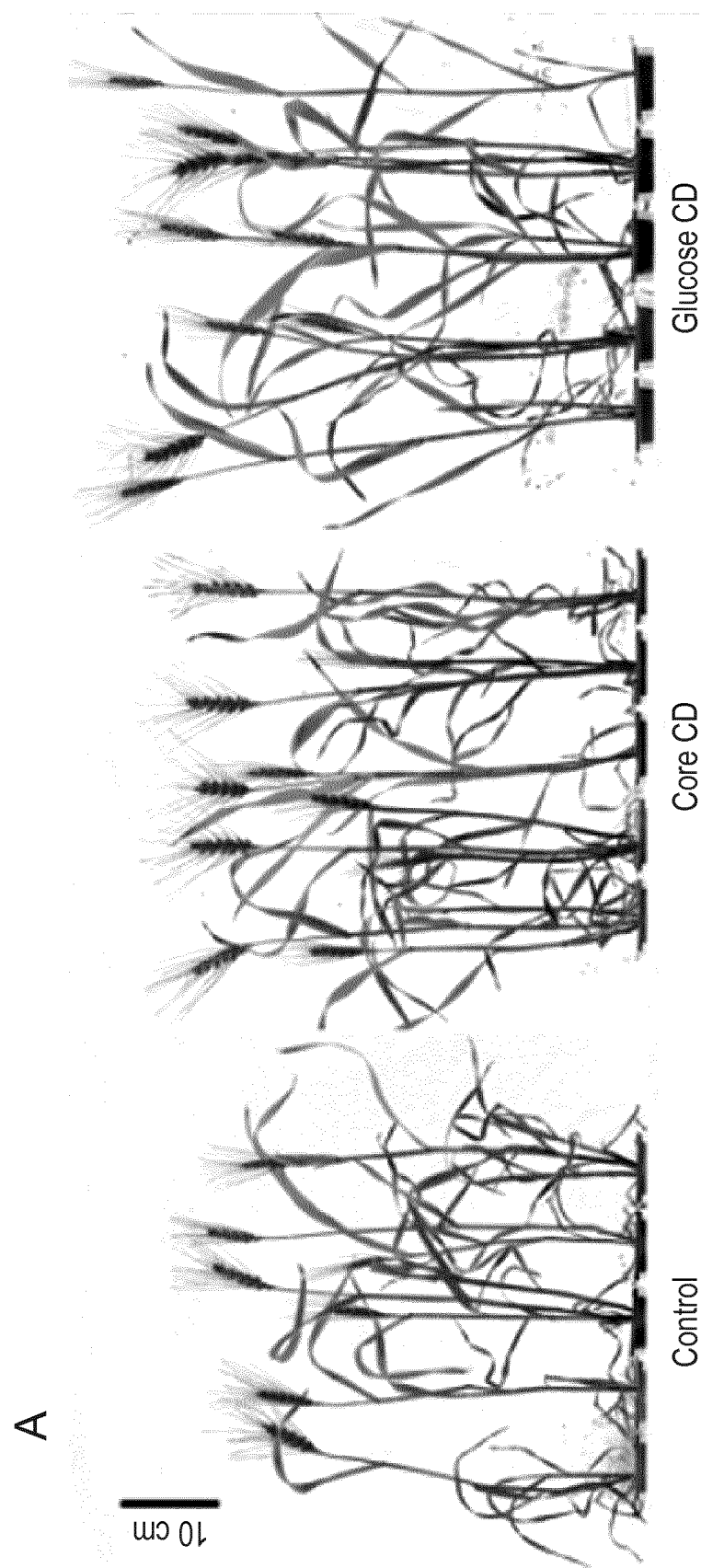
FIG. 19. Productivity of CND-treated wheat (7 weeks post germination and 4 weeks post treatment). A) image of the wheat plants after treatment, note the additional ears on the core CND and glucose CND treatments. B-D) n=44,42, 41 for the control, core CND and glucose CND treatments respectively, for (E) n=15 and (F) n=40,41,45 for the control, core CND and glucose CND treatments respectively. For each box the red central line indicates the median, the blue top edges indicate the $25^{th}$ percentile, the blue bottom edge indicates the $75^{th}$ percentile, the whiskers indicate the range excluding outliers, red plus symbols indicate outliers. 1, 2 or 3 asterisks are used to indicate p 0.05, p 0.01 or p 0.001 respectively.
Figure 19:
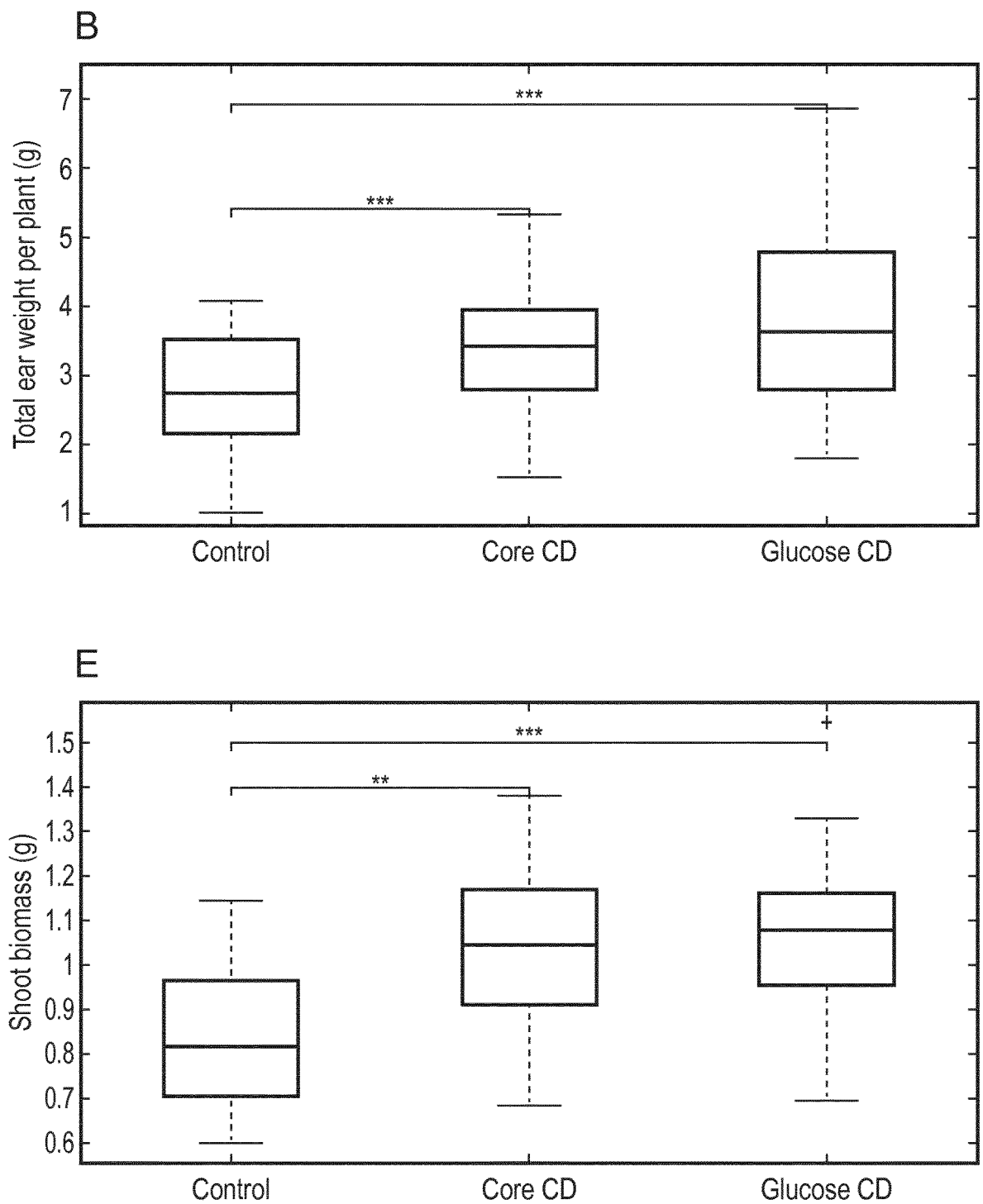
Figure 19:
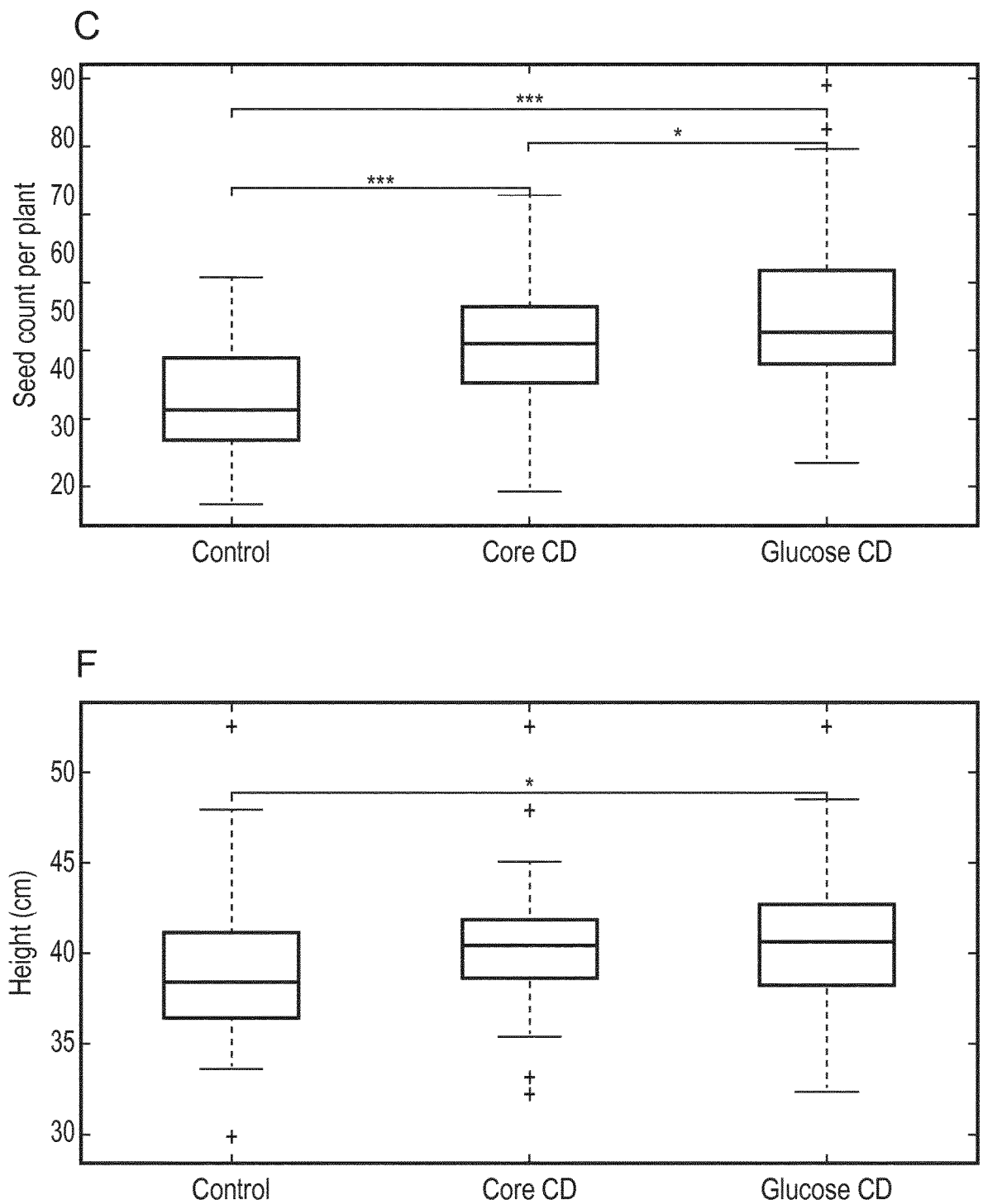
Figure 19:
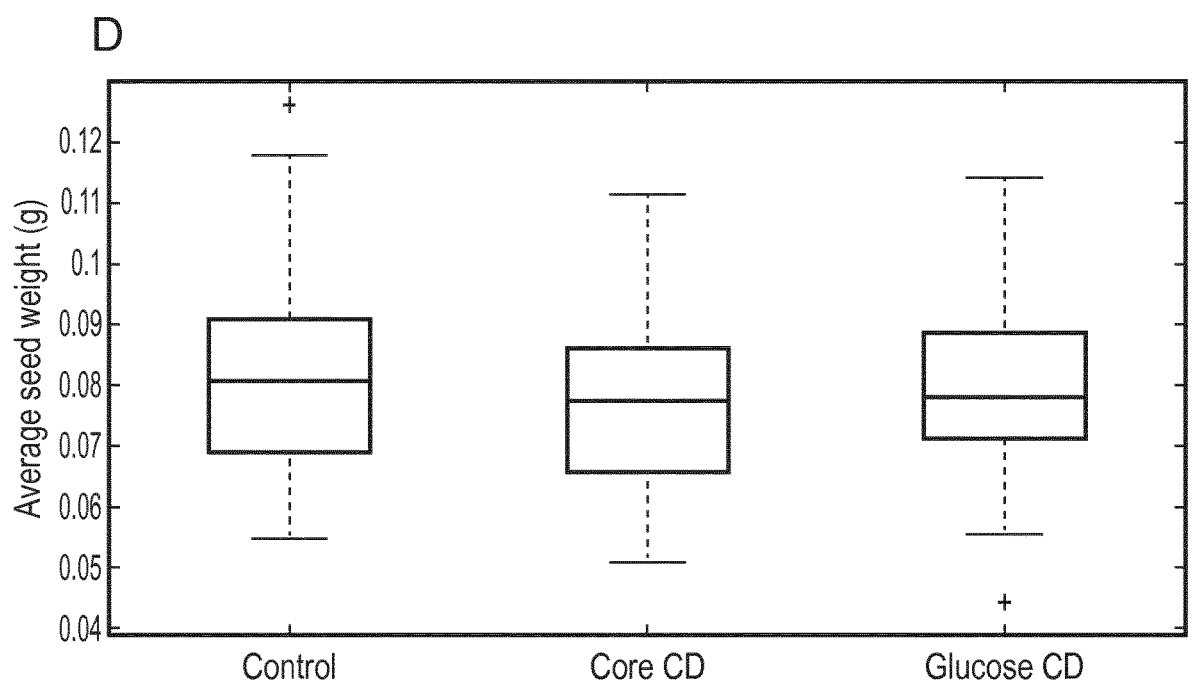

Effect of Treatment with CND Cores and Glucose-Functionalized CNDs on Wheat Productivity Glucose-functionalised CND increased the productivity of wheat, compared with untreated (control) wheat and core CND treated wheat. Plants were treated 3 weeks post germination. FIG. 19 A shows these plants 4 weeks after treatment. The total ear weight per plant for both the core and glucose CD treatments are significantly greater than control (p<0.001) with 3.8±0.2g and 3.4±0.1g respectively compared to 2.8±0.1 g for the control (FIG. 19 B). This is also shown by an increase in seed production, with the core and glucose CD producing 44±2 and 49±2 per plant respectively with the control giving 35±2 (FIG. 19, C). There was no significant change in the average weight of a seed as a result of either treatment (FIG. 19, D). This increase in yield per plant does however come at the cost of increased dry shoot biomass and height (FIG. 19, E, F).

Example 20

Effect of Treatment with CND Cores and Glucose-Functionalized CNDs on Photosynthetic Pigments Unfunctionalised amine-coated CDs (core-CDs) and glucose-functionalised CDs were synthesised and characterised using the synthetic route illustrated in Example 13. From three weeks post-germination, Triticum aestivum was treated with core-CDs, glucose-CDs or glucose via addition to aqueous plant feed solution applied directly to the soil.

Figure 21:
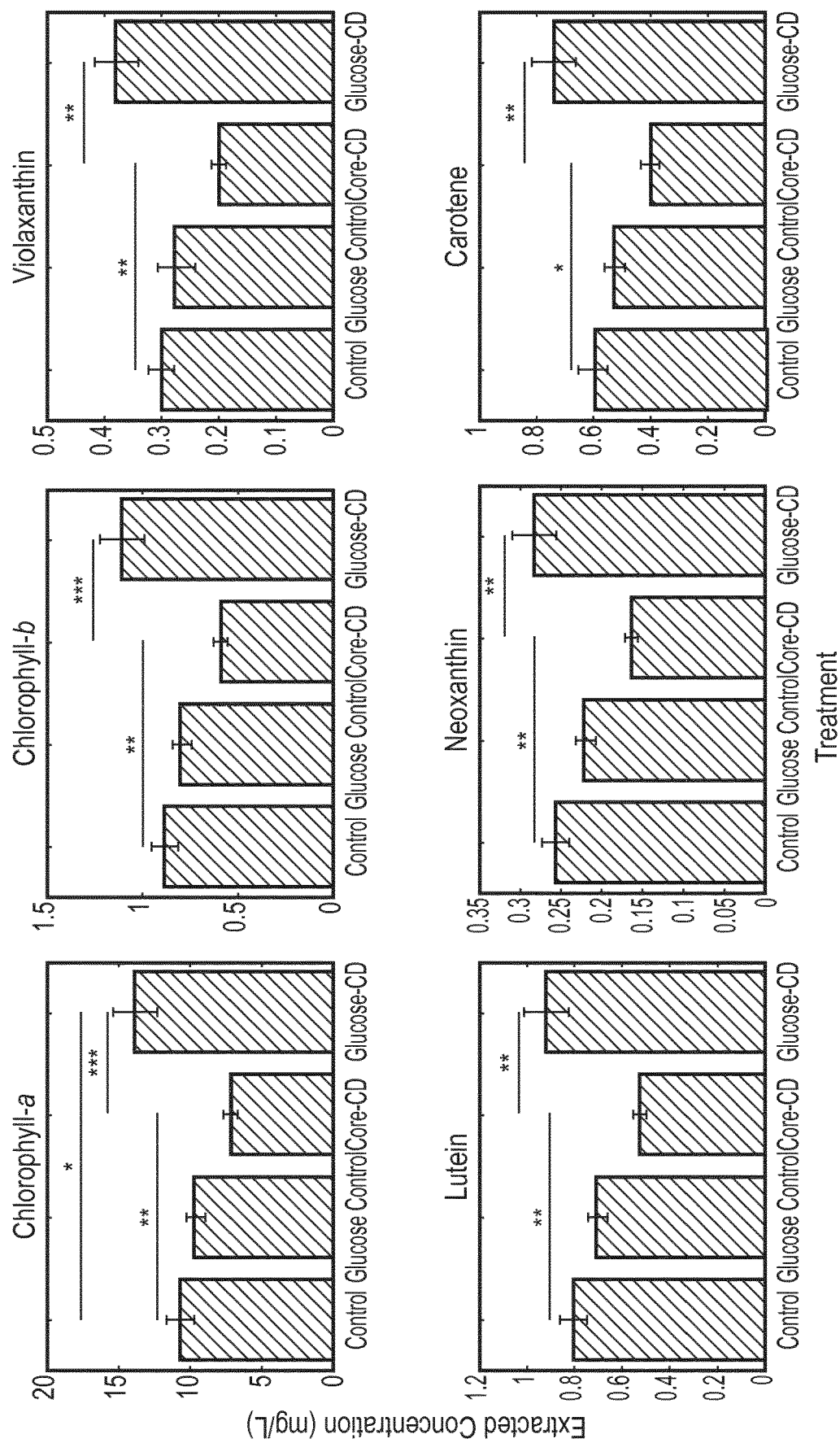
FIG. 21. Extracted concentrations of all observed pigments in CD-treated *Triticum aestivum*. 1, 2 or 3 asterisks are used to indicate p≤0.05, p≤0.01 or p≤0.001 respectively.
Figure 22:
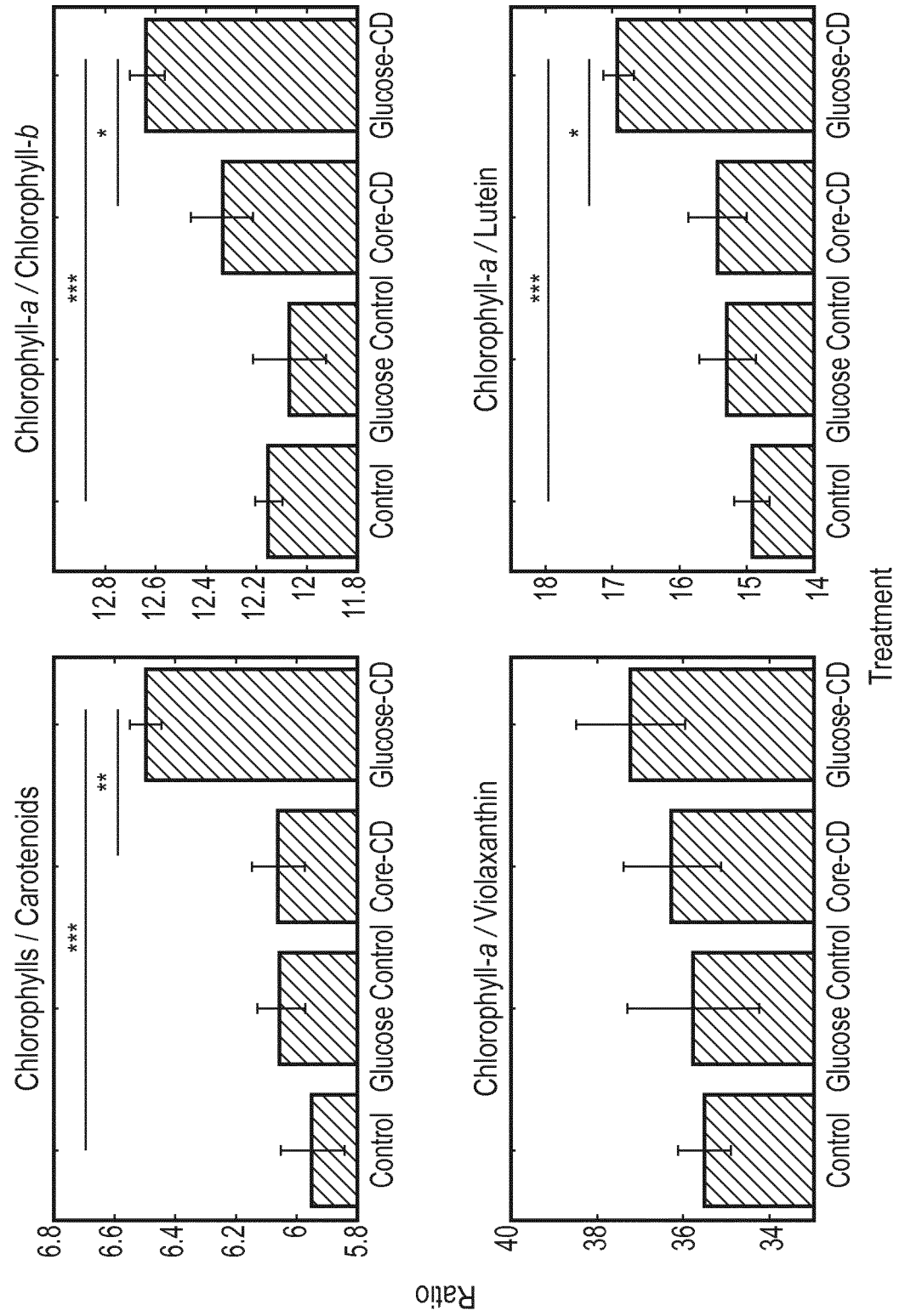
FIG. 22. Extracted pigment ratios of the CD-treated *Triticum aestivum* analysed by HPLC. N=5. 1, 2 or 3 asterisks are used to indicate p≤0.05, p≤0.01 or p≤0.001 respectively.

This experiment shows that glucose-CD treatment results in an increased production of all measured pigments and a greater ratio of chlorophylls to carotenoids and chlorophyll-a to chlorophyll-b compared to the control (FIGS. 21 and 22). The glucose-CD treatment triggers the plant to produce more light-harvesting antenna, which absorb more light, resulting in enhanced photosynthesis when combined with an increase in the efficiency of photosystem II (PSII) and reduction in non-photochemical quenching (NPQ) at high light.

Methods are based on those described by Van Heukelem and Thomas (24). All solvents used were HPLC-grade. Samples were taken at the middle of the photoperiod on the same day, 0.1 g of leaf was used for each sample, N=5. The samples were flash frozen in liquid N2, homogenized then 5 suspended in 20 ml of 95% acetone, 5% $H_2O$ mix spiked with vitamin E at 25 ng.ml$^{-1}$ as an internal standard. This mix is then passed through a 200 nm syringe filter and incubated under nitrogen in the dark at 4° C. for 16 hours. The incubated mix is passed through a 200 nm pore syringe filter. The resulting filtrate was stored in the dark at −80° C. until purification by HPLC. A stationary phase 3.5 μm spherical silica particle with an 80 A pore size was used (Agilent, 10 Eclipse XDB C8, 4.6 mm×150 mm). The column was heated to 60° C. Two solvents were used to the chromatography, A: 70% methanol, 30% $H_2O$ spiked with 28 mM tert-butyl acetoacetate at pH 6.4 and B: 100% methanol. For each pigment, the integration of the chromatogram absorbance peak is used to quantify the concentration. The integrations were first normalised against the internal standard for variance 15 in column loading volume. The concentration of the pigments was then determined using 5 external standards. The external standards chlorophylls, β-carotene and vitamin E were purchased from Sigma, the neoxanthin, violaxanthin and zeaxanthin were purchased from DHI, Denmark. 430 nm, 470 nm and 450 nm were used to detect the absorbance of chlorophyll-a, chlorophyll-b and the carotenoids respectively.

REFERENCES

A number of publications are cited above in order to more fully describe and disclose the invention and the state of the art to which the invention pertains. Full citations for these references are provided below. The entirety of each of these references is incorporated herein.
Hill et al. (Nanoscale, 2016, 8, 18630)
Feldmann and Marks (Mol. Gen. Genet (1987) 208: 1-9)
Kromdijk et al. (Science18 Nov 2016: Vol. 354, Issue 6314, pp. 857-861)
Song et al., (Food and Energy Security 2016; 5(1): 18-25)
Zhu et al., (Current Opinion in Biotechnology) Volume 19, Issue 2, April 2008, Pages 153-159
L. Van Heukelem, C. S. Thomas, Computer-assisted high-performance liquid chromatography method development with applications to the isolation and analysis of phytoplankton pigments. *Journal of Chromatography A,* 910, 31-49 (2001).

For standard molecular biology techniques, see Sambrook, J., Russel, D. W. *Molecular Cloning, A Laboratory Manual.* 3 ed. 2001, Cold Spring Harbor, New York: Cold Spring Harbor Laboratory Press.

The invention claimed is:
1. A method of modifying one or more characteristics of a plant, the method comprising contacting the plant with a carbon nanodot (CND) compound; and then propagating the plant, wherein the CND compound has the formula:

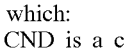

in which:
CND is a carbon nanodot having a diameter in the range 0.5-20 nm;
L is a linker selected from $C_{1-20}$ alkylene, or $C_{1-20}$ alkenylene groups optionally including 1-5 heteroatoms selected from —O—, —N(H)—, and —S—;
X is PEG-$(NR_2)_q$ associated with a nucleic acid, in which each R is independently H or $C_{1-6}$ alkyl and the integer q is 0 or 1;
wherein:
PEG is a polyethylene glycol having a weight average molecular weight (Mw) greater than 200;
the integer y is 0 or 1; wherein when y is 1, each of the CND and X moieties is attached to the L group either directly or via an amide bond;
z is an integer greater than or equal to 1; and
the modified characteristic(s) are caused by the introduced nucleic acid.
2. The method according to claim 1, wherein the one or more modified characteristics of the plant is enhancement of rate of photosynthesis.
3. The method according to claim 1, wherein the one or more modified characteristics includes the characteristic of increased growth rate.

4. The method according to claim 1, wherein the plant is a crop.

5. The method according to claim 4, wherein the crop is wheat, tobacco, sorghum, maize, soybean or rice.

6. The method according to claim 4, wherein the one or more modified characteristics includes increased crop yield.

7. The method according to claim 1, wherein the CND has a diameter in the range 2-10 nm.

8. The method according to claim 1, wherein L is a $C_{3-20}$ polyether group.

9. The method according to claim 8, wherein L is 4,7,10-trioxa-1,13-tridecane attached to each of the CND and X, optionally via amide bonds.

10. The method according to claim 1, wherein both R groups are H.

11. The method according to claim 1, wherein the PEG group has a Mw between 200 and 100,000.

12. The method according to claim 1, wherein the integer q is 1.

13. The method according to claim 1, wherein the nucleic acid encodes one or more elements of a gene editing system.

14. The method according to claim 13, wherein the gene editing system is CRISPR/CAS9.

15. The method according to claim 1, wherein the nucleic acid encodes a gene product that protects the plant from disease.

16. The method according to claim 1, wherein the nucleic acid expresses a marker.

17. The method according to claim 1, wherein the plant is contacted with a solution or suspension comprising the CND compound at a concentration of no more than about 100 μg/mL.

18. The method according to claim 1, wherein the plant is contacted with the CND compound by:
   a) spraying the leaves of the plant with a solution or suspension of the CND compound;
   b) dipping the plant flower into a solution or suspension of the CND compound;
   c) contacting the roots of a plant with a solution or suspension comprising the CND compound.

19. A method of producing a genetically modified plant, the method comprising:
   a) contacting a seed with a carbon nanodot (CND) compound; and then growing the seed to produce the genetically modified plant; or
   b) contacting a plant with a carbon nanodot (CND) compound and propagating the plant, wherein the CND compound has the formula:

$$CND\text{-}[(L)_y\text{-}X]_z$$

in which:
   CND is a carbon nanodot having a diameter in the range 0.5-20 nm;
   L is a linker selected from $C_{1-20}$ alkylene, or $C_{1-20}$ alkenylene groups optionally including 1-5 heteroatoms selected from —O—, —N(H)—, and —S—;
   X is PEG-$(NR_2)_q$ associated with a nucleic acid, in which each R is independently H or $C_{1-6}$ alkyl and the integer q is 0 or 1;
   wherein PEG is a polyethylene glycol having a weight average molecular weight (Mw) greater than 200;
   the integer y is 0 or 1; wherein when y is 1, each of the CND and X moieties is attached to the L group either directly or via an amide bond; and
   z is an integer greater or equal to 1.

20. The method of producing a genetically modified plant according to claim 19, wherein the genetically modified plant produces a desired product that is not produced in plants of the same species that have not been contacted under comparable conditions with the CND compound.

21. A method of producing a desired product, the method comprising performing the method according to claim 19 and then harvesting all or part of the genetically modified plant, and extracting the desired product.

22. The method according to claim 21, wherein the desired product is a protein.

23. A plant comprising a CND compound having the formula:

$$CND\text{-}[(L)_y\text{-}X]_z$$

in which:
CND is a carbon nanodot having a diameter in the range 0.5-20 nm;
L is a linker selected from $C_{1-20}$ alkylene, or $C_{1-20}$ alkenylene groups optionally including 1-5 heteroatoms selected from —O—, —N(H)—, and —S—;
X is PEG-(NR2) q associated with a nucleic acid heterologous to the plant, in which each R is independently H or $C_{1-6}$ alkyl and the integer q is 0 or 1;
wherein PEG is a polyethylene glycol having a weight average molecular weight (Mw) greater than 200;
the integer y is 0 or 1; wherein when y is 1, each of the CND and X moieties is attached to the L group either directly or via an amide bond; and
z is an integer greater or equal to 1.

* * * * *